(12) United States Patent
Wantland

(10) Patent No.: US 10,484,530 B2
(45) Date of Patent: Nov. 19, 2019

(54) SENSOR BASED COMPONENT ACTIVATION

(71) Applicant: Google LLC, Mountain View, CA (US)

(72) Inventor: Tim Wantland, Bellevue, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/805,886

(22) Filed: Nov. 7, 2017

(65) Prior Publication Data

US 2019/0141181 A1    May 9, 2019

(51) Int. Cl.

| H04M 1/00 | (2006.01) |
|---|---|
| H04M 1/725 | (2006.01) |
| G06F 1/16 | (2006.01) |
| G06F 1/3231 | (2019.01) |
| G06F 1/3234 | (2019.01) |
| G06F 1/3287 | (2019.01) |
| G06F 3/01 | (2006.01) |

(Continued)

(52) U.S. Cl.
CPC ...... *H04M 1/72569* (2013.01); *G06F 1/1626* (2013.01); *G06F 1/1694* (2013.01); *G06F 1/3231* (2013.01); *G06F 1/3265* (2013.01); *G06F 1/3287* (2013.01); *G06F 3/012* (2013.01); *G06F 3/013* (2013.01); *G06F 3/017* (2013.01); *G06F 2200/1637* (2013.01); *G06N 3/0445* (2013.01); *G06N 3/084* (2013.01); *H04M 2250/12* (2013.01); *H04M 2250/22* (2013.01); *H04M 2250/52* (2013.01)

(58) Field of Classification Search
CPC ......... H04M 1/72569; H04M 2250/12; H04M 2250/52

USPC ...................................................... 455/556.1
See application file for complete search history.

(56) References Cited

U.S. PATENT DOCUMENTS

| 8,532,675 B1 * | 9/2013 | Pasquero .......... H04M 1/72572 455/456.3 |
|---|---|---|
| 9,442,564 B1 * | 9/2016 | Dillon ...................... G06F 3/012 |
| 9,448,658 B2 * | 9/2016 | Westerman ........... G06F 3/0235 |

(Continued)

FOREIGN PATENT DOCUMENTS

| JP | 2014194650 | 10/2014 |
|---|---|---|
| WO | WO2017031089 | 2/2017 |

OTHER PUBLICATIONS

International Search Report and Written Opinion for PCT/US2018/048665, dated Nov. 21, 2018, 16 pages.

*Primary Examiner* — April G Gonzales
(74) *Attorney, Agent, or Firm* — Dority & Manning, P.A.

(57) ABSTRACT

Provided are methods, systems, and devices for activating components of a computing device based on a mode associated with the state of objects including a computing device. Sensor data based sensor outputs from one or more sensors that detect one or more objects can be received. Based in part on the sensor data, the state of the one or more objects can be determined. The state of the one or more objects can include one or more spatial relations of the one or more objects with respect to a computing system. When the state of the one or more objects satisfies one or more operational criteria, a mode associated with activating a component of the computing system can be activated. The component can include a microphone component, a camera component, or a text input component. The component can be associated with performing including input detection.

20 Claims, 13 Drawing Sheets

(51) Int. Cl.
*G06N 3/04* (2006.01)
*G06N 3/08* (2006.01)

(56) References Cited

U.S. PATENT DOCUMENTS

| | | | | |
|---|---|---|---|---|
| 9,652,031 B1* | 5/2017 | Savastinuk | ............ | G06F 3/012 |
| 9,832,452 B1* | 11/2017 | Fotland | ............ | H04N 13/20 |
| 2009/0209293 A1 | 8/2009 | Louch | | |
| 2010/0138680 A1* | 6/2010 | Brisebois | ............ | G06F 1/1626 |
| | | | | 713/324 |
| 2010/0277579 A1 | 11/2010 | Cho et al. | | |
| 2012/0287031 A1* | 11/2012 | Valko | ............ | G09G 5/00 |
| | | | | 345/156 |
| 2012/0306770 A1 | 12/2012 | Moore et al. | | |
| 2013/0053007 A1* | 2/2013 | Cosman | ............ | G06F 3/017 |
| | | | | 455/414.3 |
| 2014/0085460 A1* | 3/2014 | Park | ............ | G06F 21/84 |
| | | | | 348/135 |
| 2014/0149754 A1* | 5/2014 | Silva | ............ | G06F 1/3212 |
| | | | | 713/300 |
| 2014/0210754 A1 | 7/2014 | Ryu et al. | | |
| 2015/0316983 A1 | 11/2015 | Park et al. | | |
| 2015/0331569 A1 | 11/2015 | Kang et al. | | |
| 2015/0363034 A1* | 12/2015 | Hinckley | ............ | G06F 3/0414 |
| | | | | 345/173 |
| 2015/0363035 A1* | 12/2015 | Hinckley | ............ | G06F 3/0383 |
| | | | | 345/173 |
| 2016/0062458 A1 | 3/2016 | Kristensson et al. | | |
| 2016/0091965 A1 | 3/2016 | Wang et al. | | |
| 2016/0094814 A1* | 3/2016 | Gousev | ............ | G06K 9/6267 |
| | | | | 348/143 |
| 2016/0337588 A1* | 11/2016 | Wei | ............ | H04M 1/72522 |
| 2016/0371046 A1 | 12/2016 | Komiyama | ............ | G06F 3/1423 |
| 2017/0116478 A1* | 4/2017 | Gousev | ............ | G06K 9/6267 |
| 2017/0132466 A1* | 5/2017 | Gousev | ............ | G06K 9/00604 |
| 2017/0161579 A1* | 6/2017 | Gousev | ............ | G06F 3/011 |
| 2017/0344838 A1* | 11/2017 | Zhou | ............ | G06K 9/00355 |
| 2017/0371450 A1* | 12/2017 | Heller | ............ | G06F 3/044 |
| 2017/0374322 A1* | 12/2017 | Gousev | ............ | G06K 9/6267 |
| 2018/0095588 A1* | 4/2018 | Klein | ............ | G06F 3/0416 |
| 2018/0173948 A1* | 6/2018 | Gousev | ............ | G06K 9/00604 |

* cited by examiner

SENSOR BASED COMPONENT ACTIVATION

FIELD

The present disclosure relates generally to activating components of a computing device based on a mode associated with the state of one or more objects detected relative to a computing device.

BACKGROUND

Object detection systems can capture information associated with the state of objects, including, for example, the identity of an object. The information associated with the state of the objects can be used in various ways including to determine the position or location of the objects. Additionally, an object detection system can employ a variety of different ways to determine the state of objects. For example, the object detection system can use a variety of sensors to capture different types of states (e.g., a camera to capture images and/or a microphone to capture sounds) of the objects. Further, an object detection system can associate information relating to a detected object (e.g., the dimensions of the object) with another piece of information such as the type of the object, which can be useful in generating various outputs.

However, many existing object detection systems require a great deal of manual input on the part of a user, which can be laborious. Further, many of the existing object detection systems provide limited functionality or have functionality that is infrequently used due to a cumbersome user interface. Accordingly, it would be beneficial if there was a way to more operate a device based on the outputs from an object detection system.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of mode determination. The method can include receiving, by a computing system including one or more computing devices, object detection data based in part on one or more sensor outputs from the plurality of sensors that detect one or more portions of a user of the computing system. Further, the method can include receiving, by the computing system, motion data based in part on one or more sensor outputs from the plurality of sensors, the motion data describing a motion of the computing system relative to the user of the computing system. The method can include determining, by the computing system, based in part on the object detection data and the motion data, the state of the one or more portions of the user of the computing system including one or more spatial relations of the one or more portions of the user of the computing system with respect to the computing system. Further, the method can include, responsive to the state of the one or more portions of the user of the computing system satisfying one or more operational criteria, activating, by the computing system, an input mode of a plurality of input modes associated with activating one or more components of the computing system, the one or more components comprising one or more microphone components, one or more camera components, or one or more text input components. The one or more components can be associated with performing one or more operations comprising detection of one or more inputs.

Another example aspect of the present disclosure is directed to a mode determination system that include one or more processors; a machine-learned mode determination model, in which the machine-learned mode determination model has been trained to receive sensor data and, in response to receipt of the sensor data, output mode predictions for a computing device; and at least one tangible, non-transitory computer readable medium that stores instructions that, when executed by the one or more processors, cause the one or more processors to perform operations. The operations can include obtaining sensor data from a plurality of sensors of a computing device. The sensor data can include at least motion data indicative of a motion of the computing device and object detection data identifying one or more objects proximate to the computing device. The operations can include inputting the sensor data into the machine-learned mode determination model. The operations can include receiving, as output of the machine-learned mode determination model, a mode prediction for the computing device.

Another example aspect of the present disclosure is directed to a computing device that automatically initiates an input mode and can include a plurality of sensors; at least one processor; and at least one tangible, non-transitory computer-readable medium that stores instructions that, when executed by the at least one processor, cause the at least one processor to perform operations. The operations can include receiving sensor data based in part on one or more sensor outputs from one or more sensors that detect one or more objects. The operations can include determining, based in part on the sensor data, the state of the one or more objects. The state of the one or more objects can include one or more spatial relations of the one or more objects with respect to the computing system. Responsive to the state of the one or more objects satisfying one or more operational criteria, the operations can include activating a mode of a plurality of modes associated with activating one or more components of the computing system. The one or more components can include one or more microphone components, one or more camera components, or one or more text input components. The one or more components can be associated with performing one or more operations including detection of one or more inputs.

Other example aspects of the present disclosure are directed to other computer-implemented methods, systems, apparatus, tangible, non-transitory computer-readable media, user interfaces, memory devices, computer program products, and electronic devices for sensor based component activation.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
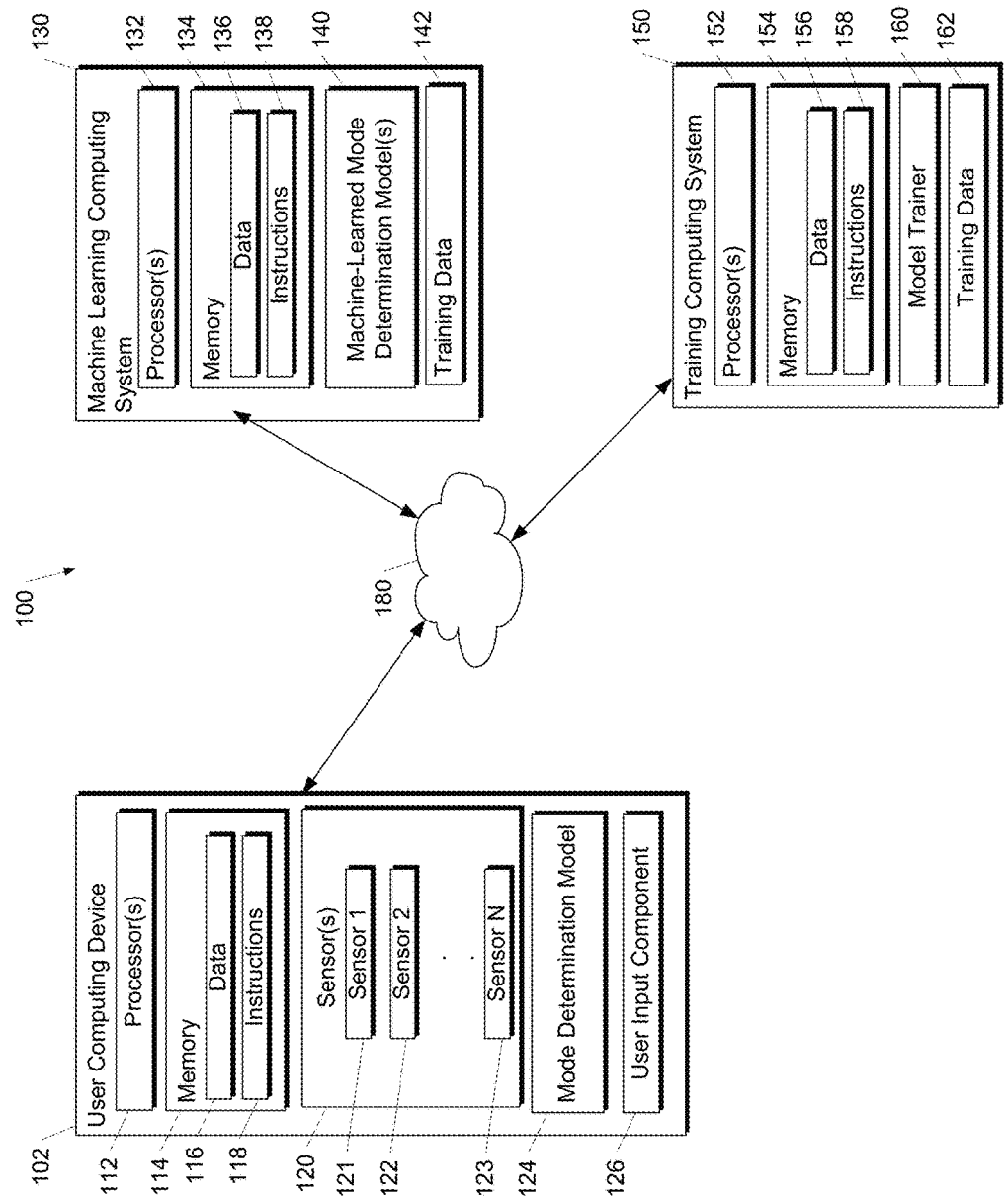
FIG. 1 depicts a diagram of an example system according to example embodiments of the present disclosure.

Example aspects of the present disclosure are directed to activating one or more components of a computing device (e.g., a mobile computing device) based in part on the state of the computing device (e.g., position, motion, orientation of the computing device) and/or the state of one or more objects (e.g., a person, a portion of a person including a face, finger, hand, or a stylus or other object) detected by the computing device. A computing device in accordance with the disclosed technology can receive sensor data, received from a plurality of sensors, and associated with the state of the computing device and/or one or more objects, determine, based in part on the object detection data, the state of the computing device and/or one or more objects including one or more spatial relations of the one or more objects (e.g., a user moving towards the computing device), and/or responsive to the state of the one or more objects satisfying one or more operational criteria (e.g., the one or more objects are within a predetermined distance of the computing device), activating one or more components of the computing device (e.g., activate a camera, microphone, or text input interface of the computing device).

The sensor data can include object detection data from a plurality of sensors that detects one or more portions of a user of the computing device. Further, the sensor data can include motion data describing a motion of the computing device relative to a user of the computing device. The computing device can also be configured to operate in an input mode (e.g., camera mode, voice mode, keyboard mode) such that one or more user inputs can be received via the activated component(s) associated with a corresponding input mode.

As such, the disclosed technology can more effectively (e.g., more quickly and with less utilization of computing and battery resources) determine the state of one or more objects including one or more spatial relations of the computing device with respect to one or more objects (e.g., a user of the computing system) and activate one or more components of the computing device.

By way of example, the computing device (e.g., a smart phone, a tablet computing device, or a computing device that can be worn by the user) can be carried by a user. The computing device can receive sensor data (e.g., object detection data and/or motion data) from one or more sensors including an image sensor (e.g., a camera) that can capture one or more images and a tactile sensor that can detect pressure, resistance and/or capacitance. The computing device can determine, based in part on the sensor data (e.g., object detection data and/or motion data) that the one or more objects include a face (e.g., the user's face) that is within thirty centimeters of the computing system. Based on detecting that the face is within the predetermined proximity of the computing system (e.g., thirty centimeters), the computing system can activate a microphone to receive audio inputs from the user.

In some embodiments, the disclosed technology can include a computing system (e.g., a mode determination system) that can include one or more computing devices (e.g., devices with one or more computer processors and a memory that can store one or more instructions) that can exchange (send and/or receive), process, generate, and/or modify data including one or more information patterns or structures that can be stored on one or more memory devices (e.g., random access memory) and/or storage devices (e.g., a hard disk drive and/or a solid state drive); and/or one or more signals (e.g., electronic signals).

The data and/or one or more signals can be exchanged by the mode determination system with various other devices including remote computing devices that can provide object data associated with, or including, sensor data (e.g., object detection data and/or motion data) associated with various attributes of one or more objects (e.g., physical dimensions and/or the appearance of the one or more objects) and/or location data associated with the location of one or more objects; and/or one or more sensor devices that can provide sensor output based in part on the state of one or more objects (e.g., camera images of the one or more objects from an image sensor) that can be used to determine the state of the one or more objects.

In some embodiments, the mode determination system can include a display component (e.g., a liquid crystal display (LCD), a light emitting diode (LED), an organic light emitting diode (OLED), plasma display panel, electronic ink, and/or a cathode ray tube) that is configured to display one or more images that can include images of the one or more objects detected by one or more sensors.

In some embodiments, the display component can include a touch display component that includes a touch-sensitive component (e.g., a touch-sensitive display screen or a touch pad or one or more tactile sensors) that is sensitive to the touch of a user input object (e.g., a finger or a stylus). Touch and/or motion of the user input object relative to the touch-sensitive component can enable the display component to gather one form of sensor data (e.g., object detection data and/or motion data) for receipt by the mode determination system.

The mode determination system can receive object detection data based in part on one or more sensor outputs from one or more sensors. In some embodiments, the object detection data is based in part on one or more sensor outputs from the plurality of sensors that detect one or more portions of a user of the computing device (e.g., the mode determination system). For example, the one or more sensors can detect one or more portions of the user, whose state can be determined by the mode determination system.

Further, the one or more sensors can determine the state of an environment including for example the temperature, brightness, humidity, or pressure (e.g., air pressure) of an environment. The one or more sensors can include one or more image sensors (e.g., one or more cameras); one or more audio sensors; one or more tactile sensors; one or more motion sensors; one or more proximity sensors; one or more electromagnetic sensors; one or more thermal sensors; and/or one or more radar devices. For example, the one or more image sensors can be used to determine when a face is within the field of view of the one or more image sensors and use the detected face to activate one or more modes of the mode determination system.

The object detection data can include information associated with the state of the one or more objects including one or more sensor outputs from the plurality of sensors that detect one or more portions of a user of the computing device (e.g., the mode determination system). The state of the one or more objects can include a temporal state (e.g., the time of day when the one or more sensor outputs associated with the state of the one or more objects was generated by the one or more sensors) that can also include one or more durations of events associated with the one or more objects (e.g., the duration that a detected gaze is directed at the mode determination system).

Further, the state of the one or more objects can include a position state associated with the position or location of the one or more objects including a latitude, longitude and altitude, an orientation (e.g., a compass orientation), a location of the one or more objects relative to one another, a distance between the one or more objects and the mode determination system, and/or a location of the one or more objects relative to a point of reference including the mode determination system; and/or a physical state including one or more physical characteristics (e.g., appearance including color, brightness, and/or texture; physical dimensions including size, volume, mass, and/or weight; and/or audio characteristics).

The mode determination system can receive motion data based in part on one or more sensor outputs from one or more sensors that can be used to describe a motion of a computing device (e.g., the mode determination system) relative to the user of the computing device. For example, the one or more sensors can detect one or more objects, whose state can be determined by the mode determination system. The one or more sensors can include one or more image sensors (e.g., one or more cameras); one or more audio sensors; one or more tactile sensors; one or more motion sensors; one or more proximity sensors; one or more gyroscopic sensors; one or more accelerometers; one or more electromagnetic sensors; and/or one or more radar devices.

For example, the one or more accelerometers can include a configuration in which the one or more accelerometers can generate motion data associated with the acceleration of the mode determination system along three axes (e.g., x axis, y axis, and z axis). Further, the one or more gyroscopic sensors can be used to determine the orientation of the mode determination system. In this way, the mode determination system can use the motion data to determine the position of the mode determination system in relation to the one or more objects.

The motion data can include information associated with the state of the one or more objects including the motion of a computing device (e.g., the mode determination system) relative to a user of the computing device. The state of the one or more objects can include a temporal state (e.g., the time of day when the one or more sensor outputs associated with the state of the one or more objects was generated by the one or more sensors) that can also include one or more durations of events associated with the one or more objects (e.g., the duration that a detected gaze is directed at the mode determination system); and/or a position state associated with the position or location of the one or more objects including a latitude, longitude and altitude, an orientation (e.g., a compass orientation), a location of the one or more objects relative to one another, a distance between the one or more objects and the mode determination system, and/or a location of the one or more objects relative to a point of reference including the mode determination system.

The mode determination system can determine, based in part on the object detection data and the motion data, a state of the one or more objects which can include the state of the one or more portions of the user of the computing device, and the state of the one or more portions of the user of the computing device comprising one or more spatial relations of the one or more portions of the user of the computing device with respect to the computing device. The state of the one or more objects can include one or more spatial relations of the one or more objects with respect to the mode determination system. For example, the one or more spatial relations of the one or more objects can include a distance (e.g., a distance in millimeters, centimeters, inches or the like) and/or an orientation (e.g., an angular position of a portion of the one or more objects with respect to the mode determination system) associated with the one or more objects.

In some embodiments, the mode determination system can determine the state of the one or more objects based in part on one or more object recognition techniques. The one or more object recognition techniques can include one or more genetic algorithms, edge matching, geometric hashing, greyscale matching, gradient matching, pose clustering, scale invariant feature transform, and/or using a machine learned model to detect and/or recognize the one or more objects.

For example, the mode determination system can access a machine learned model (e.g., access a machine learned model that has been stored locally and/or a machine learned model that is accessible on a remote computing device via a network) that has been created using a classification dataset including classifier data that includes a set of classified features and a set of classified object labels associated with training data that can be based on, or associated with, a plurality of training objects (e.g., physical objects or simulated objects that are used as training inputs for the machine learned model). The machine learned model can be created using a set of cameras and microphones that captured training data including still images, video, and tactile inputs associated with one or more objects including people and portions of people. For example, the training data can include images of one or more faces, hands, and/or eyes; and one or more tactile inputs from hands touching one or more portions of a tactile sensor.

In some embodiments, the mode determination system can determine, based in part on the one or more spatial relations of the one or more objects relative to the computing device, a distance and/or an angle between the mode determination system (e.g., one or more reference points associated with the mode determination system) and at least a portion of the one or more objects. For example, the mode determination system can determine the distance and/or the angular position between an image sensor of the mode determination system and a detected face or face portion of a user. Other detected objects can include a user's hand(s) or portions thereof (e.g., thumb(s), finger(s), heel, etc.), a stylus held by or operated by a user, etc.

In some embodiments, the mode determination system can determine when the distance or the angle between the mode determination system and the portion of the one or more objects is within a distance range or angle range respectively. For example, the mode determination system can determine that the detected face is within forty centimeters and at a forty-five degree angle with respect to the image sensor of the mode determination system. In some embodiments, satisfying the one or more operational criteria can include determining that the distance or the angle between the mode determination system and the one or more objects is within the distance range or the angle range respectively.

The mode determination system can determine, based in part on the object detection data, when the one or more objects includes a face. For example, the mode determination system can use one or more face detection and/or face recognition techniques to determine when a face is among the one or more objects. In some embodiments, the mode determination system can compare the face to one or more authorized faces and, based in part on matching the face to the one or more authorized faces, determine when the face is authorized to access the device.

In some embodiments, the mode determination system can determine a distance between the face and the mode determination system (e.g., the distance can be determined using one or more image sensors (e.g., a camera) and/or proximity sensors (e.g., RADAR device or the like).

The mode determination system can determine when the distance between the computing device and the face is within a distance range (e.g., determining when the distance between the face and the mode determination system is less than thirty centimeters). In some embodiments, satisfying the one or more operational criteria can include determining that the distance between the mode determination system and the face is within the distance range.

In some embodiments, the mode determination system can determine, based in part on the object detection data, a position of at least one eye of the face with respect to the mode determination system. For example, the mode determination system can analyze the geometry of the face and/or determine portions of the face associated with a pupil of an eye, to determine the position of an eye. Further, the mode determination system can determine, based in part on the position of the at least one eye of the face with respect to the mode determination system, when the mode determination system is being gazed at for a predetermined period of time (e.g., two seconds). In some embodiments, satisfying the one or more operational criteria can include determining that the mode determination system is being gazed at for a predetermined period of time.

In some embodiments, the mode determination system can determine, based in part on the motion data, motion of the mode determination system in one or more directions relative to a portion of the one or more objects. The motion of the mode determination system can include different aspects of the motion of the mode determination system including the acceleration, velocity, displacement, and/or change in the position (e.g., rotation about an axis of the motion determination system) of the motion determination system. Further, the motion of the motion determination system can be determined in multiple ways via one or more motion sensors that can include a gravity sensor, a linear acceleration sensor, a rotation vector sensor, an accelerometer, and/or a gyroscope. Motion of the motion determination system can alternatively be determined by differences in images obtained by one or more image sensors (e.g., camera components) of the mode determination system. The one or more motion sensors can include hardware-based motion sensors, software-based motion sensors, and/or motion sensors that combine the use of hardware and software to determine motion of the mode determination system. For example, the mode determination system can determine the acceleration of the mode determination system in a particular direction using one or more accelerometers in the mode determination system.

Further, the mode determination system can determine when the acceleration of the mode determination system in a predetermined direction relative to a portion of the one or more objects exceeds an acceleration threshold. For example, the predetermined direction can be directly away from the predetermined portion of the one or more objects and exceeding the acceleration threshold can occur when the mode determination system's acceleration exceeds one meter per second squared. In some embodiments, satisfying the one or more operational criteria can include the acceleration of the mode determination system in the predetermined direction exceeding the acceleration threshold.

In some embodiments, the mode determination system can determine, based in part on the motion data, acceleration and duration of the acceleration of the computing system. Further, the mode determination system can determine, based in part on the motion data, when the mode determination system undergoes acceleration within a predetermined acceleration range for a predetermined duration. For example, the mode determination system can include one or more accelerometers to determine when the acceleration of the mode determination system is within an acceleration range (e.g., an acceleration between half a meter per second squared and two meters per second squared) and also determine, using a chronometer component, when the acceleration range is maintained for the predetermined duration (e.g., a duration of half a second). In some embodiments, satisfying the one or more operational criteria can include the mode determination system undergoing acceleration within the predetermined acceleration range for the predetermined duration.

In some embodiments, the mode determination system can determine, based in part on the object detection data, that the computing device is being held in two hands when two of the one or more objects are a predetermined distance range apart and in contact with one or more tactile sensors of the mode determination system. For example, the mode determination system can include a tactile sensor on a back portion of the mode determination system (e.g., a portion of the mode determination system that is behind a display output component of the mode determination system) and determine when two of the one or more objects (e.g., two fingers) are one to three centimeters apart.

By way of further example, the tactile sensor can include a touch-screen surface that is associated with the display output component (e.g., the mode determination system will detect touching of the display output component). Further, the mode determination system can include a tactile sensor on any of the surfaces of the mode determination system (e.g., a tactile sensor on the back or edges including the left edge, right edge, top edge, or bottom edge). In some embodiments, satisfying the one or more operational criteria can include determining that the mode determination system is being held in two hands including when two of the one or more objects are a predetermined distance range apart and in contact with one or more tactile sensors of the mode determination system.

The mode determination system can determine, based in part on the object detection data, that the mode determination system is being held in two hands when two of the one or more objects are within a predetermined distance and a field of view associated with a display output component of the mode determination system. For example, the mode determination system can use a camera component to determine that two of the one or more objects (e.g., two thumbs) are within a field of view of a camera that captures one or more images on a side of the mode determination system that includes a touch screen component that receives touch inputs. In some embodiments, satisfying the one or more operational criteria can include determining that the mode determination system is being held in two hands including determining when two of the one or more objects are within a predetermined distance and a field of view associated with a display output component of the mode determination system.

The mode determination system can determine, based in part on the object detection data, that the mode determination system is being held in two hands when at least two of the one or more objects are detected to be in contact with two or more portions of one or more tactile sensors behind a front portion of a display output component of the mode determination system and two of the one or more objects are detected within a predetermined distance in front of the front portion of the display output component.

For example, the mode determination system can detect two sets of fingers behind the display output component (e.g., an LCD screen) and two thumbs within two centimeters of the display output component. In some embodiments, satisfying the one or more operational criteria can include determining that the mode determination system is being held in two hands including when at least two of the one or more objects are detected to be in contact with two or more portions of one or more tactile sensors behind a front portion of a display output component of the mode determination system and two of the one or more objects are detected within a predetermined distance in front of the front portion of the display output component.

The mode determination system can determine, based in part on the object detection data, that the computing system is being held in two hands when a first object of the one or more objects is detected to be in contact with a first portion of a tactile sensor of the computing system for a predetermined period of time before a second object of the one or more objects is detected to be in contact with a second portion of the tactile sensor.

For example, a user of the mode determination system can lift the mode determination system in one hand (thereby touching the first portion of the tactile sensor) for a predetermined period of time (e.g., a half second) before placing their other hand on the second portion of the tactile sensor of the mode determination system. In some embodiments, satisfying the one or more operational criteria can include determining that the computing system is being held in two hands when a first object of the one or more objects is detected to be in contact with a first portion of a tactile sensor of the computing system for a predetermined period of time before a second object of the one or more objects is detected to be in contact with a second portion of the tactile sensor.

In some embodiments, the object detection data described above can be provided as input to a machine-learned mode determination model. In particular, in some embodiments, the object detection data can be provided as an input vector of multiple object detection data samples to a neural network of a machine-learned mode determination model. In some implementations, a machine-learned mode determination model can be or can otherwise include various machine-learned models such as neural networks (e.g., deep recurrent neural networks) or other multi-layer non-linear models, regression-based models or the like. When the machine-learned mode determination model includes a recurrent neural network, this can be a multi-layer long short-term memory (LSTM) neural network, a multi-layer gated recurrent unit (GRU) neural network, or other form of recurrent neural network.

More particularly, in one example, a user computing device (e.g., a mobile computing device) obtains object detection data including one or more vectors of object detection data sampled from multiple sensors and also a timestamp associated with each object detection data sample. In some implementations, the multiple sensors include at least one motion sensor for determining motion/movement of a computing device (e.g., an accelerometer, a gyroscope, an image sensor, a position sensor, etc.) and at least one object detection sensor (e.g., an image sensor, a proximity sensor) for detecting objects positioned relative to the computing device (e.g., a user or portion of a user including face, hands, fingers, etc.) In some implementations, the object detection data can be iteratively updated, refreshed, or generated as additional object detection data is detected by the computing device sensors.

In some embodiments, the machine-learned mode determination model can be trained to receive such object detection data input and output a prediction of a mode for the computing device. The mode can be determined, for example, from a predefined set of modes such as a camera mode, voice mode, keyboard mode, etc.

In one example, when object detection data leads to determination that a movement of a computing device corresponds to a movement of the computing device away from a user's face, then the machine-learned mode determination model can be trained to output a prediction of a camera mode for the computing device.

In another example, when object detection data leads to determination that a movement of a computing device corresponds to a movement of the computing device towards a user's face, then the machine-learned mode determination model can be trained to output a prediction of a voice mode for the computing device.

In another example, when object detection data leads to a determination that a movement of the computing device corresponds to movement of the computing device towards a user (e.g., towards a user's face) and that object detection by the computing device corresponds to a holding configuration of the computing device indicative of a user holding the computing device with two hands, then the machine-learned mode determination model can be trained to output a prediction of a keyboard mode for the computing device.

In some implementations, when training the machine-learned mode determination model to determine an input mode for operating the computing device, a mode determination training dataset can include a large number of previously obtained object detection data samples and corresponding labels that describe corresponding input modes to be triggered or not triggered based on those object detection data samples.

In one implementation, the mode determination training dataset includes a first portion of data corresponding to object detection data samples originating from one or more computing device sensors at one or more times. Depending on the model, the object detection data samples can include time-correlated object detection data from one or more of a motion sensor, image sensor, tactile sensor, proximity sensor, and the like. Such object detection data can be recorded while a computing device is in operation by one or more users. The mode determination training dataset can further include a second portion of data corresponding to labels identifying if one or more particular modes should or should not be triggered based on the object detection data. The labels included within the second portion of data within the mode determination training dataset can be manually annotated, automatically annotated, or annotated using a combination of automatic labeling and manual labeling.

In some implementations, to train the mode determination model, a training computing system can input a first portion of a set of ground-truth data (e.g., the first portion of the mode determination training dataset corresponding to object detection data samples) into the machine-learned mode determination model to be trained. In response to receipt of such first portion, the machine-learned mode determination model outputs a mode prediction for the computing device. This output of the machine-learned mode determination model predicts the remainder of the set of ground-truth data (e.g., the second portion of the mode determination training dataset). After such prediction, the training computing system can apply or otherwise determine a loss function that compares the mode prediction(s) output by the machine-learned mode determination model to the remainder of the ground-truth data which the mode determination model attempted to predict.

The training computing system then can backpropagate the loss function through the mode determination model to train the mode determination model (e.g., by modifying one or more weights associated with the mode determination model). This process of inputting ground-truth data, determining a loss function and backpropagating the loss function through the mode determination model can be repeated numerous times as part of training the mode determination model. For example, the process can be repeated for each of numerous sets of ground-truth data provided within the mode determination training dataset.

In some implementations, after an initially trained machine-learned mode determination model is implemented on a computing device, the computing device can gather additional training samples based on interaction by one or more specific users with the computing device. These additional training samples can be used to retrain a machine-learned mode determination model to personalize the mode determination model based on specific user data (e.g., specific user voice, hand holding configurations, etc.).

In some implementations, the computing device can also be configured to determine an update that describes the parameters of a retrained machine-learned mode determination model or changes to the parameters of the machine-learned mode determination model that occurred during the retraining of model. The computing device can then transmit such update(s) to a central server computing device (e.g., "the cloud") for aggregation with other updates provided by other computing devices. Thus, the platform can enable participation in a process known as "federated learning," in which a device determines a local update to a model based on locally stored data and then communicates the local update to a cloud service (e.g., in a privacy preserving and communication efficient manner) for aggregation to generate a global update to the model.

In some embodiments, the mode determination system can determine, based in part on the object detection data and the motion data, when the state of the one or more objects relative to the mode determination system matches one or more falsing profiles associated with a state of the one or more objects relative to the mode determination system that does not activate the one or more components of the mode determination system. The object detection data and the motion data received by the mode determination system can include one or more sensory outputs that are based on actions by a user that are not intended to activate the one or more components of the mode determination system.

Accordingly, the mode determination system can include data associated with one or more falsing profiles that include information associated with sensor outputs that are associated with one or more states of the one or more objects that do not activate the one or more components of the mode determination system. For example, the one or more falsing profiles can include an acceleration range of the one or more objects relative to the mode determination system in a particular direction for a predetermined period of time. In some embodiments, satisfying the one or more operational criteria can include the state of the one or more objects relative to the mode determination system not matching any of the one or more falsing profiles.

In some embodiments, the mode determination system can determine when the one or more inputs are not received within a predetermined period of time after the activating the one or more components of the mode determination system. For example, when one or more components of the mode determination system are activated and the one or more inputs (e.g., touching a display output component of the mode determination system) are not received within three seconds. Further, the mode determination system can generate a falsing profile based in part on the object detection data and the motion data received within a falsing time interval comprising a time when the one or more components are activated and the one or more inputs are not received. For example, the object detection data and the motion data recorded in the three seconds prior to activating the one or more components of the mode determination system can be used as the basis for a falsing profile.

The mode determination system can add the falsing profile to the one or more falsing profiles. In this way, the mode determination system can modify and improve the one or more falsing profiles by adding individualized profiles based in part on the user of the mode determination system.

In response to the state of the one or more objects satisfying one or more operational criteria, the mode determination system can activate an input mode of a plurality of input modes associated with the operation of one or more components of the mode determination system. The one or more components can be associated with performing one or more operations comprising detection of one or more inputs. The one or more components of the mode determination system can include one or more microphone components, one or more camera components, and/or one or more text input components (e.g., an onscreen keyboard generated on a touchscreen component).

For example, the plurality of input modes can include a voice mode associated with recording one or more sounds via a microphone component; a camera mode associated with capturing one or more images via a camera component; and/or a text-input mode associated with receiving one or more inputs to a text input device (e.g., a keyboard).

For example, when the state of the one or more objects includes a user holding the mode determination system in two hands the mode determination system can activate a touch display component that can detect touch inputs on a keyboard interface generated on the touch display component; when the state of the one or more objects includes the mode determination system being held close to a user's face a microphone component can be activated and receive audio inputs; and/or when the state of the one or more objects includes a user moving the mode determination system away from the user a camera component can be activated and detect one or more visual inputs (e.g., inputs to a camera sensor) and or one or more tactile inputs (e.g., inputs to a shutter control on a graphical interface associated with the camera component).

In some embodiments, the mode determination system can include a mobile device including a processor; a user input module configured to process an interaction of the user with the mobile device according to one of a plurality of input modes, and to provide the processor with an input according to the processed user interaction; a motion sensing unit configured to detect a movement of the mobile device and provide the processor with an input according to the detected movement. The processor of the mode determination system can be configured to determine an input mode from the plurality of input modes based on the detected movement of the mobile device, and control the user input module to process a user interaction according to the determined input mode. The motion sensing unit can include an accelerometer. Further, the mobile device can include a camera in which the motion sensing unit is configured to receive a signal from the camera, and to detect the movement of the mobile device based on the signal received from the camera.

The plurality of input modes can include a camera input mode. Further, the processor can be configured to control the user input module to process a user interaction according to the camera input mode when a movement of the mobile device is detected which corresponds to a movement of the mobile device away from the user's face. The plurality of input modes can include a voice input mode. The processor can be configured to control the user input module to process a user interaction according to the voice input mode when a movement of the mobile device is detected which corresponds to a movement of the mobile device towards the user's face.

The mobile device can include a plurality of touch sensors configured to detect a holding configuration with which a user is holding the mobile device. The processor can be configured to determine an input mode from the plurality of input modes based on the detected holding configuration of the mobile device. The plurality of input modes can include a keyboard input mode. The processor can be configured to control the user input module to process a user interaction according to the keyboard input mode when a movement of the mobile device is detected which corresponds to a movement of the mobile device towards the user's face and a holding configuration of the mobile device is detected which indicates that the user is holding the mobile device in two hands.

In some embodiments, a method of operating a mobile device can include detecting, by a motion sensing unit of the mobile device, a movement of the mobile device; determining, by a processor of the mobile device, an input mode from a plurality of input modes based on the detected movement of the mobile device; and/or processing, by a user input module of the mobile device, an interaction of a user with the mobile device according to one of the plurality of input modes. The detecting the movement of the mobile device can include detecting the movement using an accelerometer. The method can include receiving a signal from a camera of the mobile device.

In some embodiments, detecting the movement of the mobile device can include detecting the movement based on the signal received from the camera. Further, the plurality of input modes can include a camera input mode. Processing the interaction of the user can include processing a user interaction according to the camera input mode when a movement of the mobile device is detected which corresponds to a movement of the mobile device away from the user's face. The plurality of input modes can include a voice input mode. Processing the interaction of the user can include processing a user interaction according to the voice input mode when a movement of the mobile device is detected which corresponds to a movement of the mobile device towards the user's face.

The method can include detecting, using a plurality of touch sensors, a holding configuration with which a user is holding the mobile device. Determining the input mode from the plurality of input modes can include determining the input mode based on the detected holding configuration of the mobile device. The plurality of input modes in the method can include a keyboard input mode. Processing the interaction of the user can include processing a user interaction according to the keyboard input mode when a movement of the mobile device is detected which corresponds to a movement of the mobile device towards the user's face and a holding configuration of the mobile device is detected which indicates that the user is holding the mobile device in two hands.

Additionally, mode determination can include or be performed via a computer readable medium comprising instructions which, when executed by a processor, cause the processor to execute the method of mode determination. The instructions for mode determination can include instructions for operating a mobile device, which can include detecting, by a motion sensing unit of the mobile device, a movement of the mobile device; determining, by a processor of the mobile device, an input mode from a plurality of input modes based on the detected movement of the mobile device; and/or processing, by a user input module of the mobile device, an interaction of a user with the mobile device according to one of the plurality of input modes.

The instructions for detecting the movement of the mobile device can include detecting the movement using an accelerometer. The instructions can include receiving a signal from a camera of the mobile device. In some embodiments, detecting the movement of the mobile device can include detecting the movement based on the signal received from the camera. Further, the plurality of input modes can include a camera input mode. The instructions for mode determination can include instructions for processing the interaction of the user can include processing a user interaction according to the camera input mode when a movement of the mobile device is detected which corresponds to a movement of the mobile device away from the user's face. The plurality of input modes can include a voice input mode. The instructions for mode determination can include processing the interaction of the user can including processing a user interaction according to the voice input mode when a movement of the mobile device is detected which corresponds to a movement of the mobile device towards the user's face.

The instructions for mode determination can include detecting, using a plurality of touch sensors, a holding configuration with which a user is holding the mobile device. Determining the input mode from the plurality of input modes can include determining the input mode based on the detected holding configuration of the mobile device. The plurality of input modes in the instructions can include a keyboard input mode. The instructions for mode determination can include processing the interaction of the user can include processing a user interaction according to the keyboard input mode when a movement of the mobile device is detected which corresponds to a movement of the mobile device towards the user's face and a holding configuration of the mobile device is detected which indicates that the user is holding the mobile device in two hands.

The systems, methods, devices, and computer program products (e.g., non-transitory computer-readable media) in accordance with the disclosed technology can provide a variety of technical effects and benefits to the overall process of activating one or more components of a computing device. For example, the disclosed technology has the effect that one or more components can be activated based in part on sensor data (e.g., object detection data and/or motion data) associated with one or more sensor outputs from one or more sensors. In this way, for example, one or more components may be activated based on a spatial relation between one or more detected objects and a computing device which implements the disclosed technology.

The disclosed technology thus provides a solution to the problem of activating one or more components of a gesture component system. Implementations of the disclosed technology can reduce the number and complexity of burdensome interactions with the mode determination system that are required in order to activate one or more components of the mode determination system. The reduction in burdensome interactions (e.g., a user needing to select a particular portion of a graphical user interface to activate a component) can, aside from improving the ease of use of the mode determination system, also allow the user to engage a component more quickly, thereby conserving computational and battery resources of the mode determination system by minimizing the amount of interaction with the mode determination system before the component is activated.

By activating one or more components based on the detection of one or more objects, for example, a face or hands, the disclosed technology can particularly reduce the required interaction of a user with a graphical user interface, thereby reducing a length of time required for a display providing the graphical user interface to be active. Where the disclosed technology is implemented in, for example, a mobile computing device, a reduction in active display time is of particular importance in reducing the overall power consumption of the mobile device.

By activating one or more components based on the detection of one or more gestures, the disclosed technology can maximize the use of computing resources by selectively activating one or more components to perform various operations. For example, by determining that a text input component will be activated based on one or more gestures (e.g., two hands holding the computing device), the disclosed technology can avoid the excessive resource usage (e.g., battery power and/or processor utilization) that can result from a more burdensome approach that requires a user to perform various interactions with a user interface before the text input component is activated.

Additionally, the disclosed technology can conserve computing and battery resources by determining when one or more gestures are not associated with activating one or more components. By avoiding the unintentional activation of a component by a user, computing and battery resources associated with the activation of the component are not fruitlessly utilized. For example, the disclosed technology can leverage the power of a machine learned model, including a locally stored machine learned model that can be accessed without the need to use network resources and can be used to generate falsing profiles that can be added to existing falsing profiles to improve the avoidance of unintentional activation of one or more components over time.

The disclosed technology also offers the benefits of being able to be configured to activate a component based on one or more gestures in a way that is more ergonomic for a user. For example, the disclosed technology can be configured so that the gesture that activates a component concludes with the user's hands in a position that is associated with the component being activated (e.g., placing two hands on the mode determination system can activate a text input component so that the user can make tactile inputs to enter text into the mode determination system). In this way, extraneous movements by the user prior to activating a component can be avoided.

Accordingly, the disclosed technology provides more effective gesture based activation of one or more components to perform a variety of operations along with the added benefits of more efficient resource usage (e.g., improved utilization of computing and battery resources) and fewer incorrect activations of the one or more components.

Furthermore, the disclosed technology has the ability to bypass "hot-wording." For example, to initiate a search, a user can issue a voice command to switch to a voice mode. In the disclosed technology, the user can avoid the voice-based trigger simply by bringing the device to the face or mouth of the user, with no more burdensome requirement to open an on-device assistant. As such, the disclosed technology saves the user from tapping or performing other actions, as well as allowing the user to avoid distractions when using the device.

Another example technical effect and benefit of the present disclosure is an improvement in the extent to which the disclosed technology can be adapted or customized to work in a variety of scenarios including scenarios with small and large deployments of devices. In particular, determining modes from sensor data (e.g., object detection data and/or motion data) using machine-learned models such as neural networks result in an optimization of research efforts (e.g., less research time for the same or similar result) in comparison to manual development of a mode determination algorithm that is adjusted or tuned by the developers of the mode determination algorithm.

For example, in the case of manually developed mode determination algorithms, a developer could develop the algorithm through use of a brute-force approach (e.g., exploring the entire search space of the model) in order to create models of how different computing devices are operated by a variety of users in various situations, including, for example, different combinations of available sensors. However, using machine-learned models as disclosed in the present disclosure, a network can be trained using training data that is adapted for the intended use-cases of the present disclosure (e.g., gesture based mode determination). Further, the use of such machine-learned models can be performed using very large datasets (e.g., millions of training objects), which would be impracticable using a manual approach.

Additionally, the machine-learned models can be updated on a continuous basis as new training data is made available to customize a single model (e.g., a machine learned model on a user's device) or to generate updates for a central model that can then be distributed to numerous other devices. Accordingly, use of machine-learned models to automatically (e.g., without laborious and burdensome user interactions) determine modes across multiple sensors, the amount of effort required to identify and exploit the benefits of correlations among such multiple sensors can be significantly reduced.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

With reference now to FIGS. 1-14, example aspects of the present disclosure will be disclosed in greater detail. FIG. 1 depicts an example computing system 100 to perform machine learning to implement a mode determination system according to example embodiments of the present disclosure. The computing system 100 includes a user computing device 102, a machine learning computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the one or more processors 112 to cause the user computing device 102 to perform operations.

The user computing device 102 can include multiple sensors 120. In some implementations, user computing device 102 has two or more sensors up to a total number of N sensors (e.g., Sensor 1 121, Sensor 2 122, . . . , Sensor N 123). Each sensor 121-123, respectively, can be indicative of one or more measured parameters in the sensor's physical environment. Sensors 121-123 can include, but are not limited to, a motion sensor, an accelerometer, a gyroscope, an orientation sensor, a magnetic field sensor, an audio sensor (e.g., microphone), an image sensor (e.g., camera), a linear acceleration sensor, a gravity sensor, a rotation vector sensor, a magnetometer, a location sensor (e.g., GPS), an inertial motion unit, an odometer, a barometer, a thermometer, a hygrometer, a touch-sensitive sensor, a fingerprint sensor, a proximity sensor, any combination of such sensors and others, etc. Sensors 121-123 can be configured to gather sensor data including object detection data and motion data as described herein.

The user computing device 102 can store or include one or more mode determination models 124.

In some implementations, the one or more mode determination models 124 can be received from the machine learning computing system 130 over network 180, stored in the user computing device memory 114, and then used or otherwise implemented by the one or more processors 112. In some implementations, the user computing device 102 can implement multiple parallel instances of a single mode determination model 124 (e.g., to perform parallel processing of sensor data and mode determination and related component activation).

The user computing device 102 can also include one or more user input components 126 that receive user input. For example, the user input component 126 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The machine learning computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected.

The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the one or more processors 132 to cause the machine learning computing system 130 to perform operations.

In some implementations, the machine learning computing system 130 includes or is otherwise implemented by one or more server computing devices. In instances in which the machine learning computing system 130 includes plural server computing devices, such server computing devices can operate according to sequential computing architectures, parallel computing architectures, or some combination thereof.

The machine learning computing system 130 can store or otherwise include one or more machine-learned mode determination models 140. For example, the mode determination model(s) 140 can be or can otherwise include various machine-learned models such as neural networks (e.g., deep recurrent neural networks) or other multi-layer non-linear models, regression-based models or the like. Example mode determination model(s) 140 are discussed with reference to FIG. 2.

The machine learning computing system 130 can train the mode determination model(s) 140 via interaction with the training computing system 150 that is communicatively coupled over the network 180. The training computing system 150 can be separate from the machine learning computing system 130 or can be a portion of the machine learning computing system 130.

The training computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor(s) 152 to cause the training computing system 150 to perform operations. In some implementations, the training computing system 150 includes or is otherwise implemented by one or more server computing devices.

The training computing system 150 can include a model trainer 160 that trains the machine-learned mode determination model(s) 140 stored at the machine learning computing system 130 using various training or learning techniques, such as, for example, backwards propagation (e.g., truncated backpropagation through time). The model trainer 160 can perform a number of generalization techniques (e.g., weight decays, dropouts, etc.) to improve the generalization capability of the models being trained.

In particular, the model trainer 160 can train one or more mode determination models 140 based on a set of training data 142. The training data 142 can include ground-truth sensor data (e.g., ground-truth vectors that describe recorded sensor readings or other sensor data). In some implementations, if the user has provided consent, the training examples can be provided by the user computing device 102 (e.g., based on sensor data detected by the user computing device 102). Thus, in such implementations, the mode determination model 124 provided to the user computing device 102 can be trained by the training computing system 150 on user-specific sensor data received from the user computing device 102. In some instances, this process can be referred to as personalizing the model.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device 102 can include the model trainer 160 and the training dataset 162. In such implementations, the mode determination model 124 can be both trained and used locally at the user computing device 102.

Figure 2:
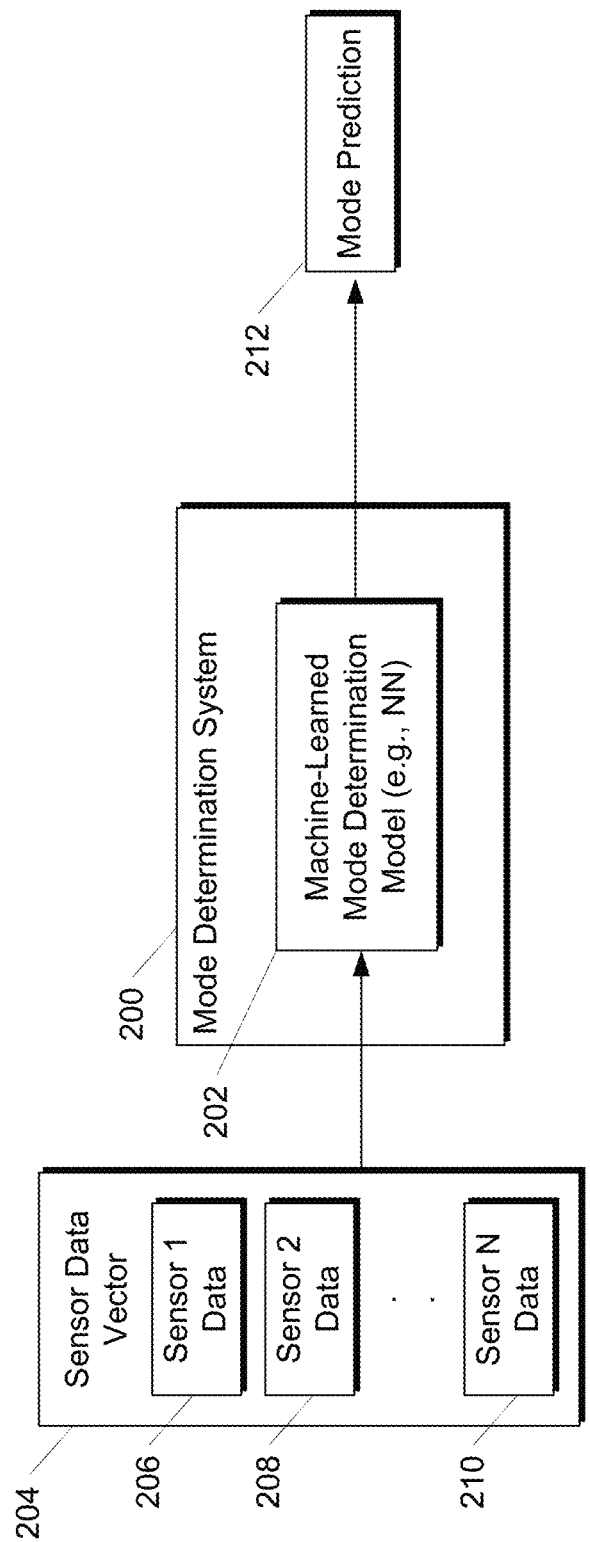
FIG. 2 depicts a diagram of an example system including a mode determination system according to example embodiments of the present disclosure.

FIG. 2 depicts a first example mode determination system 200 according to example embodiments of the present disclosure. In the particular implementation of FIG. 2, mode determination system 200 includes a machine-learned mode determination model 202.

The machine-learned mode determination model 202 can be a machine-learned model. In some implementations, machine-learned mode determination model 202 can be or can otherwise include various machine-learned models such as neural networks (e.g., deep recurrent neural networks) or other multi-layer non-linear models, regression-based models or the like. When machine-learned mode determination model 202 includes a recurrent neural network, this can be a multi-layer long short-term memory (LSTM) neural network, a multi-layer gated recurrent unit (GRU) neural network, or other form of recurrent neural network.

The machine-learned mode determination model 202 can be configured to receive sensor data from multiple sensors. In one example, a user computing device (e.g., a mobile computing device such as a smartphone) can obtain sensor data from multiple sensors that can be collectively represented as a vector of sensor data 204. In some examples, the sensor data 204 includes sensor data from two or more sensors. In some implementations, sensor data 204 includes sensor data from N different sensors (e.g., Sensor 1, Sensor 2, . . . , Sensor N) such that each vector of sensor data 204 has N dimensions, each dimension corresponding to sensor data 206-210, for one of the N different sensors, respectively. The sensor data 206-210 from each sensor as gathered in sensor data 204 can be indicative of one or more measured parameters in the sensor's physical environment.

Sensors from which sensor data 206-210 is obtained can include, but are not limited to, a motion sensor, an accelerometer, a gyroscope, an orientation sensor, a magnetic field sensor, an audio sensor (e.g., microphone), an image sensor (e.g., camera), a linear acceleration sensor, a gravity sensor, a rotation vector sensor, a magnetometer, a location sensor (e.g., GPS), an inertial motion unit, an odometer, a barometer, a thermometer, a hygrometer, a touch-sensitive sensor, a fingerprint sensor, a proximity sensor, any combination of such sensors and others, etc. Sensors from which sensor data 206-210 is obtained can include, for example, sensors 121-123 as depicted in FIG. 1.

Machine-learned mode determination model 202 can be trained to recognize correlations among sensor data 206-210 from the multiple sensors in sensor data 204. Machine-learned mode determination model 202 can output a mode prediction 212 that includes one or more predicted modes in response to receipt of the sensor data 206-210 in sensor data 204.

In some examples, the mode prediction 212 corresponds to a single input mode determined from a plurality of input modes associated with activating one or more components of a computing system (e.g., a mobile computing device operated by a user). Example input modes associated with mode prediction 212 can include, for example, camera mode, voice mode, and keyboard mode. In other examples, mode prediction 212 can provide two or more predicted modes. The machine-learned mode determination model 202 can first learn and then leverage the correlation between multiple sensors (e.g., the sensors providing sensor data 204) to help improve mode prediction 212. For instance, the sensor data from one motion sensor (e.g., accelerometer readings) can be used in conjunction with sensor data from another motion sensor (e.g., gyroscope readings) to help improve the determination of motion data for a computing device and the ultimate mode prediction 212. Mode predictions 212 can thus represent, for example, predictions based in part on sensor data from multiple sensors (e.g., an accelerometer and a gyroscope).

In some implementations, the machine-learned mode determination model 202 can learn nuanced and complex correlations or inter-dependencies between a significant number of sensors (e.g., more than two as provided in the example above) and can holistically apply such learned correlations to improve or otherwise refine the mode prediction 212. Sensor correlation can also help the machine-learned mode determination model 202 to identify and manage sensor data outliers that may arise from noisy and/or faulty measurement at certain instances of time.

In some implementations, the machine-learned mode determination model 202 can be a temporal model that allows the sensor data 204 to be referenced in time. In such implementations, the sensor data provided as input to the machine-learned mode determination model 202 can be a sequence of T inputs, each input corresponding to a sensor data 204 obtained at a different time step. For instance, a time-stepped sequence of sensor data from multiple sensors can be obtained iteratively. Consider sensor data obtained from N different sensors that is iteratively obtained at T different sample times (e.g., t1, t2, . . . , tT). In such example, an N-dimensional vector of sensor data 204 providing a sensor reading for each of the N different sensors is obtained for each of the T different times. Each of these vectors of sensor data 204 can be iteratively provided as input to the mode determination model 202 as it is iteratively obtained. In some examples, the time difference between the T different sample times (e.g., t1, t2, . . . , tT) can be the same or it can be different.

Figure 3:
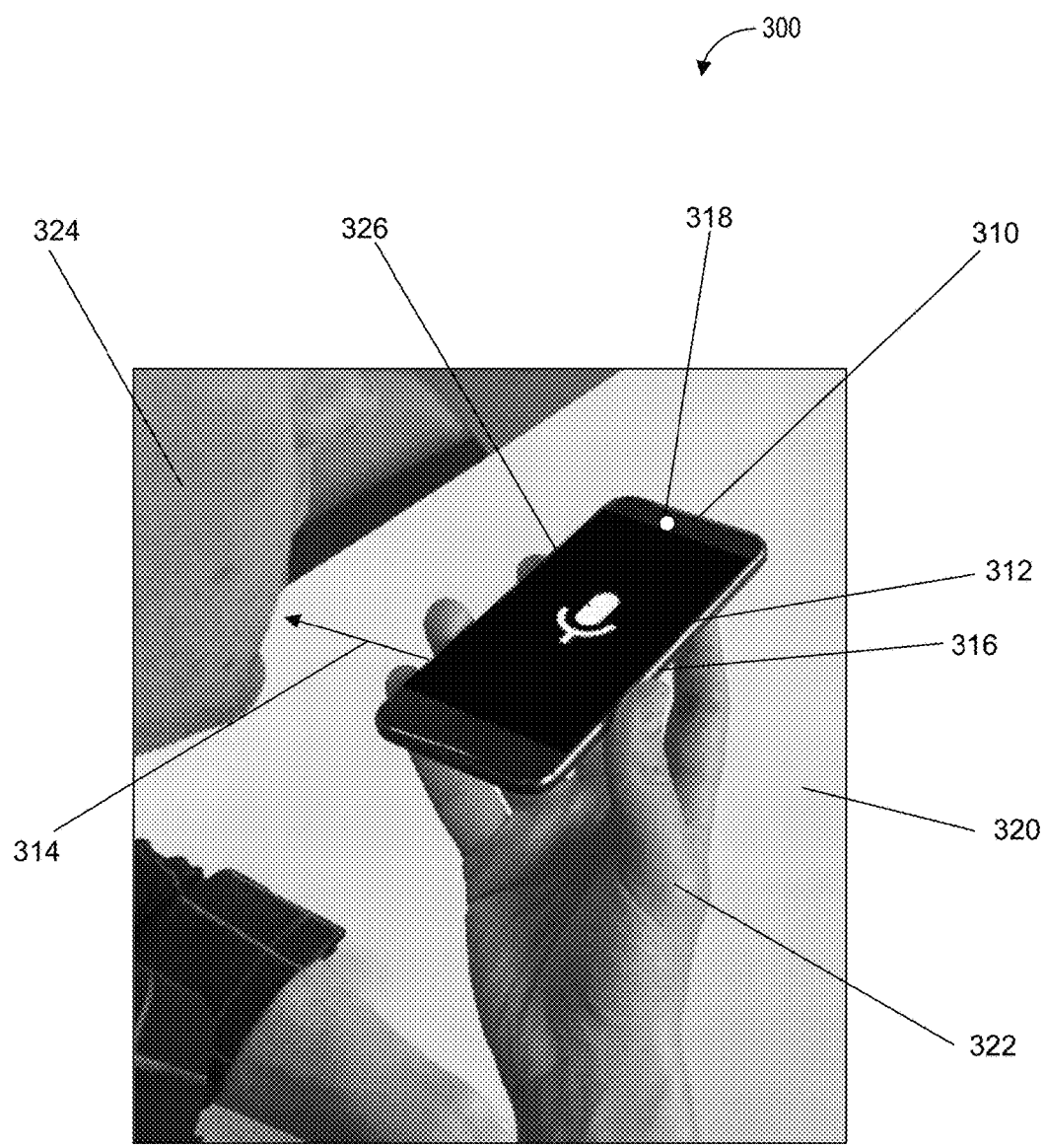
FIG. 3 depicts an example of sensor based component activation including voice mode activation according to example embodiments of the present disclosure.

FIG. 3 depicts an example of sensor based component activation including voice mode activation according to example embodiments of the present disclosure. FIG. 3 includes an illustration of an environment 300, one or more portions of which can be detected, recognized, and/or processed by one or more systems (e.g., one or more computing systems) or devices (e.g., one or more computing devices) including, the user computing device 102 shown in FIG. 1, and/or the mode determination system 200 shown in FIG. 2. Further, the detection, recognition, and/or processing of one or more portions of the environment 300 can be implemented as an algorithm on the hardware components of one or more devices or systems (e.g., the user computing device 102, and/or the mode determination system 200) to, for example, activate a mode associated with the operation of one or more components. As shown in FIG. 3, the environment 300 includes a mode determination device 310, a display output component 312, a path 314, a tactile sensor 316, an image sensor 318, an object 320, an object 322, an object 324, and an icon 326.

The display output component 312 of the mode determination device 310 can display one or more images including images associated with an operating mode of the mode determination device 310, one or more objects including the object 320 and the object 322, and/or an environment including the environment 300. The mode determination device 310 can include one or more sensors (e.g., one or more motion sensors, image sensors, tactile sensors, and/or radar sensors) that can be used to determine the state of the mode determination device 310 (e.g., position and/or location of the mode determination device 310) including the state of the mode determination device 310 relative to one or more objects including the objects 320, 322, and 324. For example, the mode determination device 310 can determine based on the tactile sensor 316 that the mode determination device 310 has been touched by the object 322 (e.g., a user's hand).

The mode determination device 310 can also determine based on one or more motion sensors (including, for example, image sensor 318 and/or additional motion sensors not shown such as accelerometers and/or gyroscopes), that the mode determination device 310 has been moved and that the mode determination device 310 has traveled between the object 320 (e.g., a table top) towards the object 324 (e.g., a user's head) along the path 314. Based on sensor outputs from the image sensor 318 (e.g., a camera), the mode determination device 310 can determine that the object 324 is a user's head. In some embodiments, the mode determination device 310 can also determine, using one or more object detection techniques, that the object 324 includes a face portion, which can be used to authorize use of the mode determination device 310 by an authorized user.

The mode determination device 310 can determine, based on the sensor output, from the sensors including the tactile sensor 316, image sensor 318, and the motion sensors (including, for example, image sensor 318 and/or additional motion sensors not shown) that the mode determination device 310 is being moved along the path 314 towards the object 324. When, for example, the motion determination device 310 has been moved along the path 314 for a predetermined period of time (e.g., 1 second) or has travelled a predetermined distance (e.g., twenty centimeters), the mode determination device can activate a mode that can include activating one or more components of the mode determination device 310 (e.g., a microphone, a camera, and/or text input component) which can be configured to receive one or more inputs (e.g., one or more sound inputs, light inputs, and or tactile inputs). In this example, the mode determination device 310 activates a microphone as indicated by an icon 326 (e.g., a microphone icon) displayed on the display output component 312. Activation of the microphone component within mode determination device 310 can be associated with operation of mode determination device 310 in a voice input mode such that voice inputs can be received from a user via the microphone.

Figure 4:
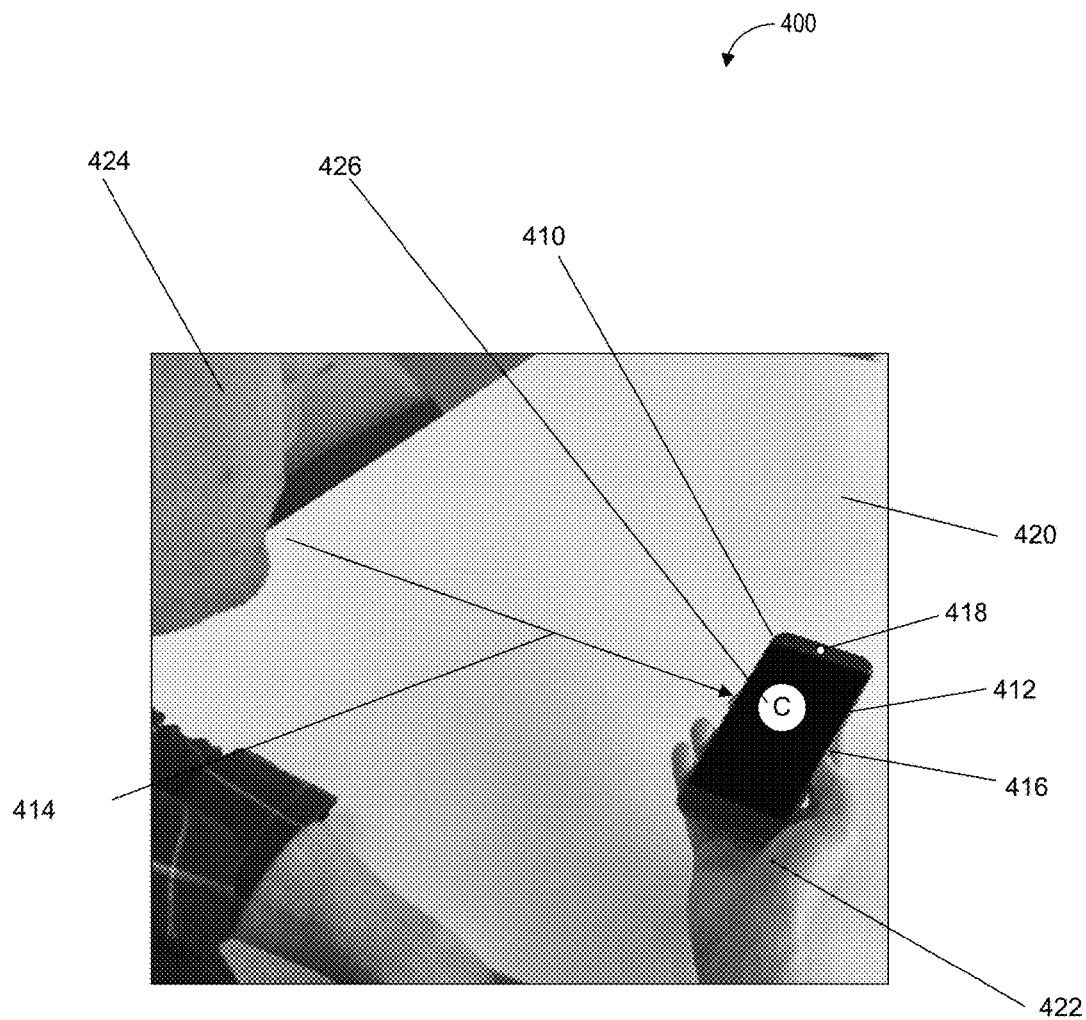
FIG. 4 depicts an example of sensor based component activation including camera mode activation according to example embodiments of the present disclosure.

FIG. 4 depicts an example of sensor based component activation including camera mode activation according to example embodiments of the present disclosure. FIG. 4 includes an illustration of an environment 400, one or more portions of which can be detected, recognized, and/or processed by one or more systems (e.g., one or more computing systems) or devices (e.g., one or more computing devices) including, the user computing device 102 shown in FIG. 1, and/or the mode determination system 200 shown in FIG. 2. Further, the detection, recognition, and/or processing of one or more portions of the environment 400 can be implemented as an algorithm on the hardware components of one or more devices or systems (e.g., the user computing device 102, and/or the mode determination system 200) to, for example, activate a mode associated with the operation of one or more components. As shown in FIG. 4, the environment 400 includes a mode determination device 410, a display output component 412, a path 414, a tactile sensor 416, an image sensor 418, an object 420, an object 422, an object 424, and an interface element 426 (e.g., a camera icon).

The display output component 412 of the mode determination device 410 can display one or more images including images associated with an operating mode of the mode determination device 410, one or more objects including the objects 420, 422, and 424, and/or an environment including the environment 400. The mode determination device 410 can include one or more sensors (e.g., one or more motion sensors, image sensors, tactile sensors, and/or radar sensors) that can be used to determine the state of the mode determination device 410 (e.g., a position and/or location of the mode determination device 410) including the state of the mode determination device 410 relative to one or more objects including the objects 420, 422, and 424. For example, the mode determination device 410 can determine based on the tactile sensor 416 that the mode determination device 410 has been touched by the object 422 (e.g., a user's hand).

The mode determination device 410 can also determine based on one or more motion sensors (including, for example, image sensor 418 and/or additional motion sensors not shown) including accelerometers and/or gyroscopes, that the mode determination device 410 has been moved and that the mode determination device 410 has traveled between a location within a predetermined distance of the object 424 (e.g., a user's head) towards the object 420 (e.g., a table) along the path 414. Based on sensor outputs from the image sensor 418 (e.g., a camera), the mode determination device 410 can determine that the object 424 is a user's head.

The mode determination device 410 can determine, based on the sensor output, from the sensors including the tactile sensor 416, image sensor 418, and the motion sensors (including, for example, image sensor 418 and/or additional motion sensors not shown) that the mode determination device 410 is being moved along the path 414 towards the object 424. In some embodiments, the determination of the position of the mode determination device 410 relative to the objects 420 and 424 can be based on sensor outputs from one or more radar devices (not shown) of the mode determination device 410.

When, for example, the motion determination device 410 has been moved along the path 414 for a predetermined period of time (e.g., half a second) or has travelled a predetermined distance (e.g., thirty centimeters), the mode determination device 410 can activate a mode that can include activating one or more components of the mode determination device 410 (e.g., a microphone, a camera, and/or text input component) which can be configured to receive one or more inputs (e.g., one or more sound inputs, light inputs, and or tactile inputs). In this example, the mode determination device 410 activates the camera (e.g., image sensor 418) as indicated by an interface element 426 (e.g., the camera icon) displayed on the display output component 412. Activation of the camera component within mode determination device 410 can be associated with operation of mode determination device 410 in a camera input mode such that image inputs can be received from a user via the camera.

Figure 5:
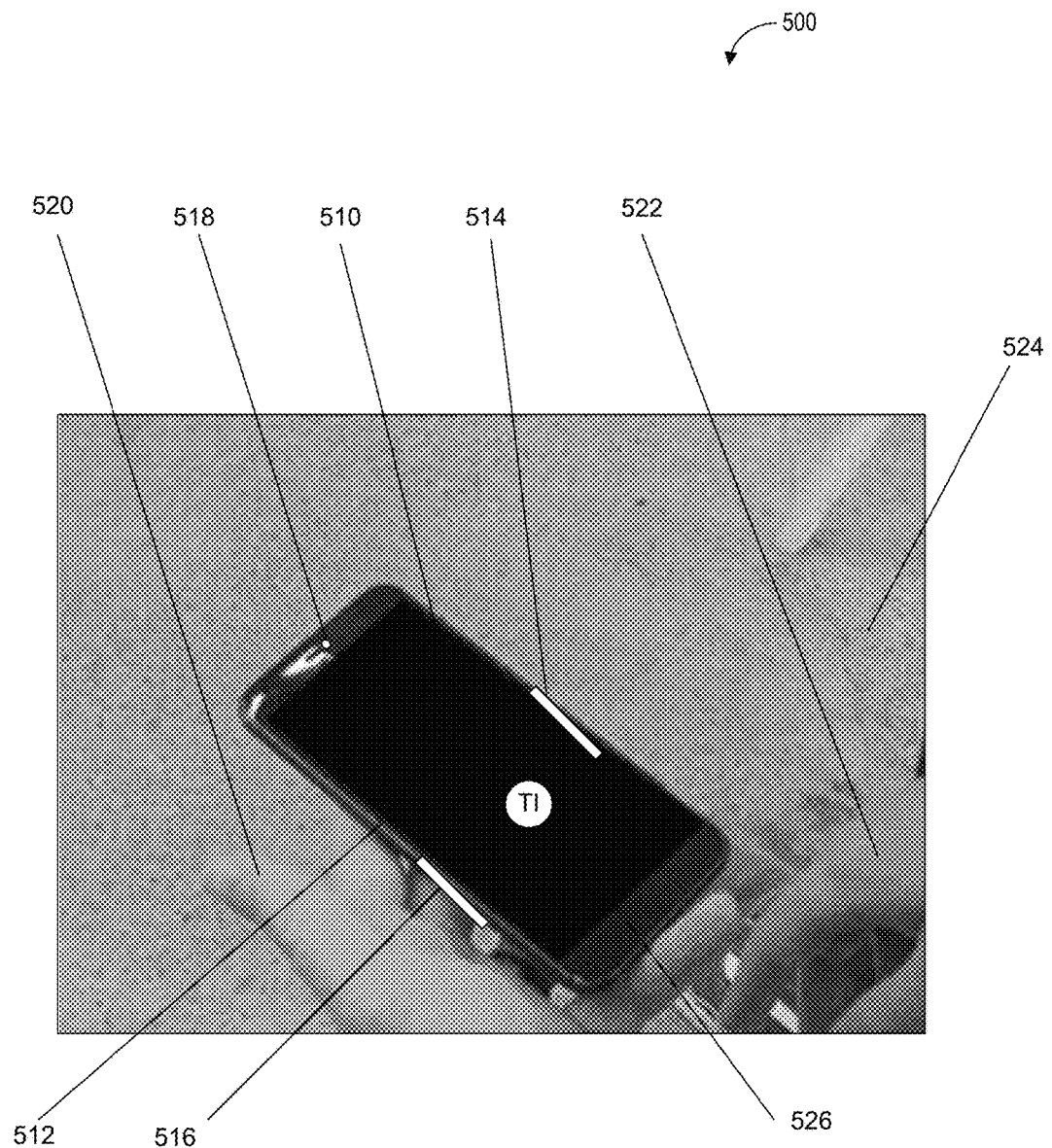
FIG. 5 depicts an example of sensor based component activation including text input mode activation according to example embodiments of the present disclosure.

FIG. 5 depicts an example of sensor based component activation including text input mode activation according to example embodiments of the present disclosure. FIG. 5 includes an illustration of an environment 500, one or more portions of which can be detected, recognized, and/or processed by one or more systems (e.g., one or more computing systems) or devices (e.g., one or more computing devices) including, the user computing device 102 shown in FIG. 1, and/or the mode determination system 200 shown in FIG. 2. Further, the detection, recognition, and/or processing of one or more portions of the environment 500 can be implemented as an algorithm on the hardware components of one or more devices or systems (e.g., the user computing device 102, and/or the mode determination system 200) to, for example, activate a mode associated with the operation of one or more components. As shown in FIG. 5, the environment 500 includes a mode determination device 510, a display output component 512, a tactile sensor 514, a tactile sensor 516, an image sensor 518, an object 520, an object 522, an object 524, and an interface element 526.

The display output component 512 of the mode determination device 510 can display one or more images including images associated with an operating mode of the mode determination device 510 and/or an environment including the environment 500. The mode determination device 510 can include one or more sensors (e.g., one or more motion sensors, image sensors, tactile sensors, and/or radar sensors) that can be used to determine the state of the mode determination device 510 (e.g., position and/or location of the mode determination device 510) including the state of the mode determination device 510 relative to one or more objects including the objects 520, 522, and 524. For example, the mode determination device 510 can determine based on the tactile sensors 514 and 516 that the mode determination device 510 has been touched by the object 520 (e.g., a user's left hand) and/or the object 522 (e.g., a user's right hand).

The mode determination device 510 can also determine based on one or more motion sensors (including, for example, image sensor 518 and/or additional motion sensors not shown including accelerometers and/or gyroscopes), that the mode determination device 510 has been moved and that the position (e.g., an angle of the mode determination device 510 relative to another object) of the mode determination device 510 has changed with respect to the object 524 (e.g., the ground). In some embodiments, the mode determination device 510 can also determine, using one or more object detection techniques, that the mode determination device 510 is being gazed at (e.g., gazed at by a user of the mode determination device 510).

Based on the determination that the mode determination device 510 is being gazed at and/or the angle of the mode determination device 510 with respect to one or more objects, the mode determination device can activate a mode including activating one or more components of the mode determination device 510 (e.g., a microphone, a camera, and/or text input component) which can be configured to receive one or more inputs (e.g., one or more sound inputs, light inputs, and or tactile inputs). In this example, the mode determination device 510 activates a text input mode as indicated by an interface element 526 (e.g., a text input icon) displayed on the display output component 512. Activation of an onscreen keyboard within mode determination device 510 can be associated with operation of mode determination device 510 in a text input mode (e.g., a keyboard mode) such that text inputs can be received from a user via the display output component 512.

Figure 6:
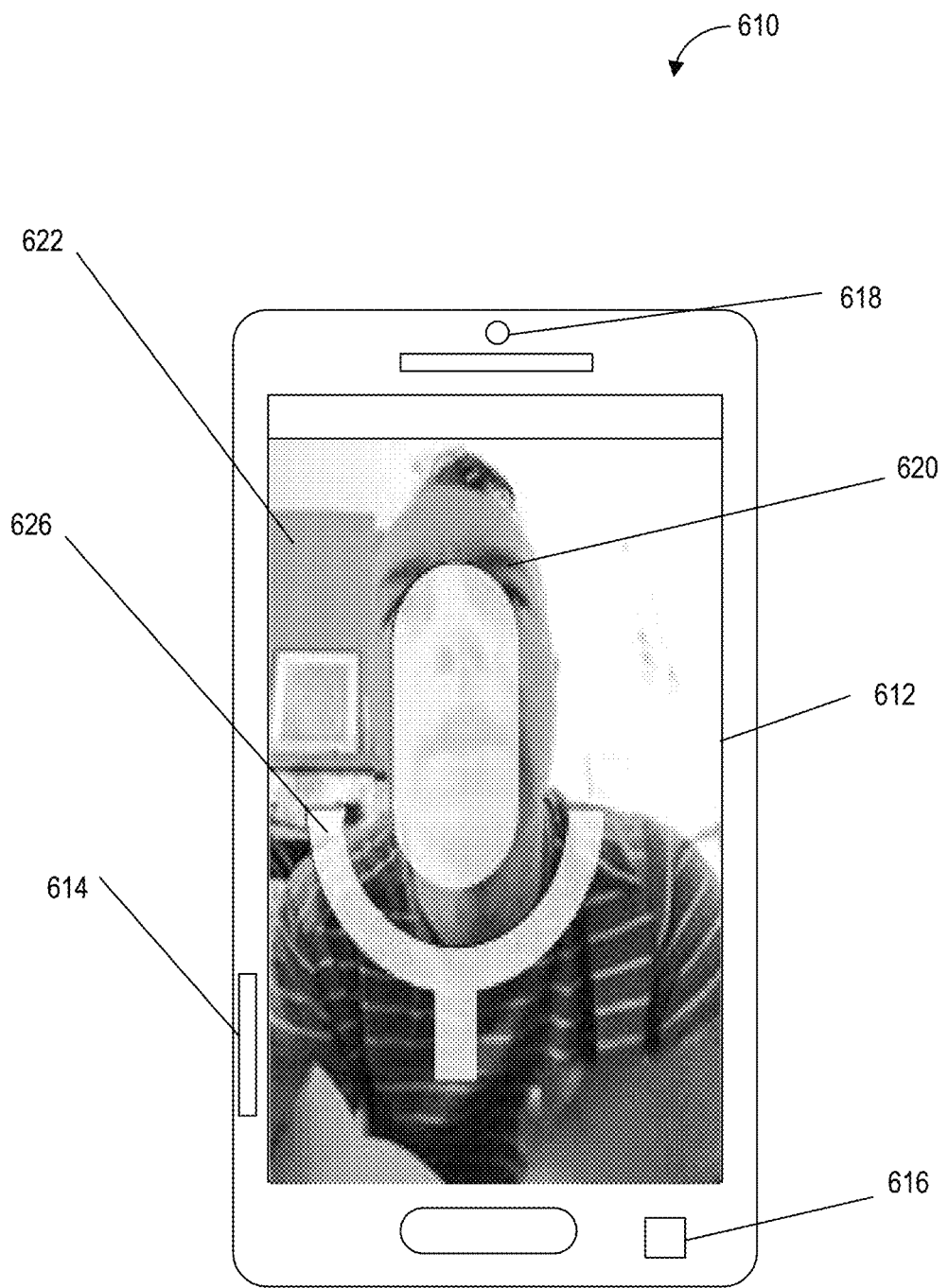
FIG. 6 depicts an example of a mode determination device including sensor based microphone component activation according to example embodiments of the present disclosure.

FIG. 6 depicts an example of a mode determination device including sensor based microphone component activation according to example embodiments of the present disclosure. FIG. 6 includes an illustration of mode determination device 610, one or more portions of which can include one or more systems (e.g., one or more computing systems) or devices (e.g., one or more computing devices) including one or more portions of the user computing device 102 shown in FIG. 1, and/or the mode determination system 200 shown in FIG. 2. Further, the detection, recognition, and/or processing by the mode determination device 610 can be implemented as an algorithm on the hardware components of one or more devices or systems (e.g., the user computing device 102, and/or the mode determination system 200) to, for example, activate a mode associated with the operation of one or more components. As shown, FIG. 6 illustrates a mode determination device 610, a display output component 612, a tactile sensor 614, a microphone component 616, an image sensor 618, an object 620, an object 622, and an interface element 626.

The display output component 612 of the mode determination device 610 can display one or more images including images associated with an operating mode of the mode determination device 610 and/or an environment associated with the mode determination device 610. The mode determination device 610 can include one or more sensors (e.g., one or more motion sensors, image sensors, tactile sensors, and/or radar sensors) that can be used to determine the state of the mode determination device 610 (e.g., position and/or location of the mode determination device 610) including the state of the mode determination device 610 relative to one or more objects including the objects 620 and 622. For example, the mode determination device 610 can determine, based in part on one or more sensor outputs from the tactile sensor 614, that the mode determination device 610 has been picked up by the object 620 (e.g., a person). The mode determination device 610 can also determine based on one or more motion sensors (including, for example, image sensor 618 and/or additional motion sensors not shown including accelerometers and/or gyroscopes), that the mode determination device 610 has been moved and that the position (e.g., an angle of the mode determination device 610 relative to another object) of the mode determination device 610 has changed with respect to the object 620.

Based on a determination that the angle of the mode determination device 610 with respect to the object 620 is within an angle threshold range or that the distance between the mode determination device 610 is within a threshold distance of the object 620, the mode determination device can activate a mode including activating one or more components of the mode determination device 610 (e.g., a microphone, a camera, and/or text input component) which can be configured to receive one or more inputs (e.g., one or more sound inputs, light inputs, and or tactile inputs). In this example, the mode determination device 610 activates a voice mode associated with the microphone component 616 as indicated by the interface element 626 (e.g., a microphone icon) displayed on the display output component 612.

Figure 7:
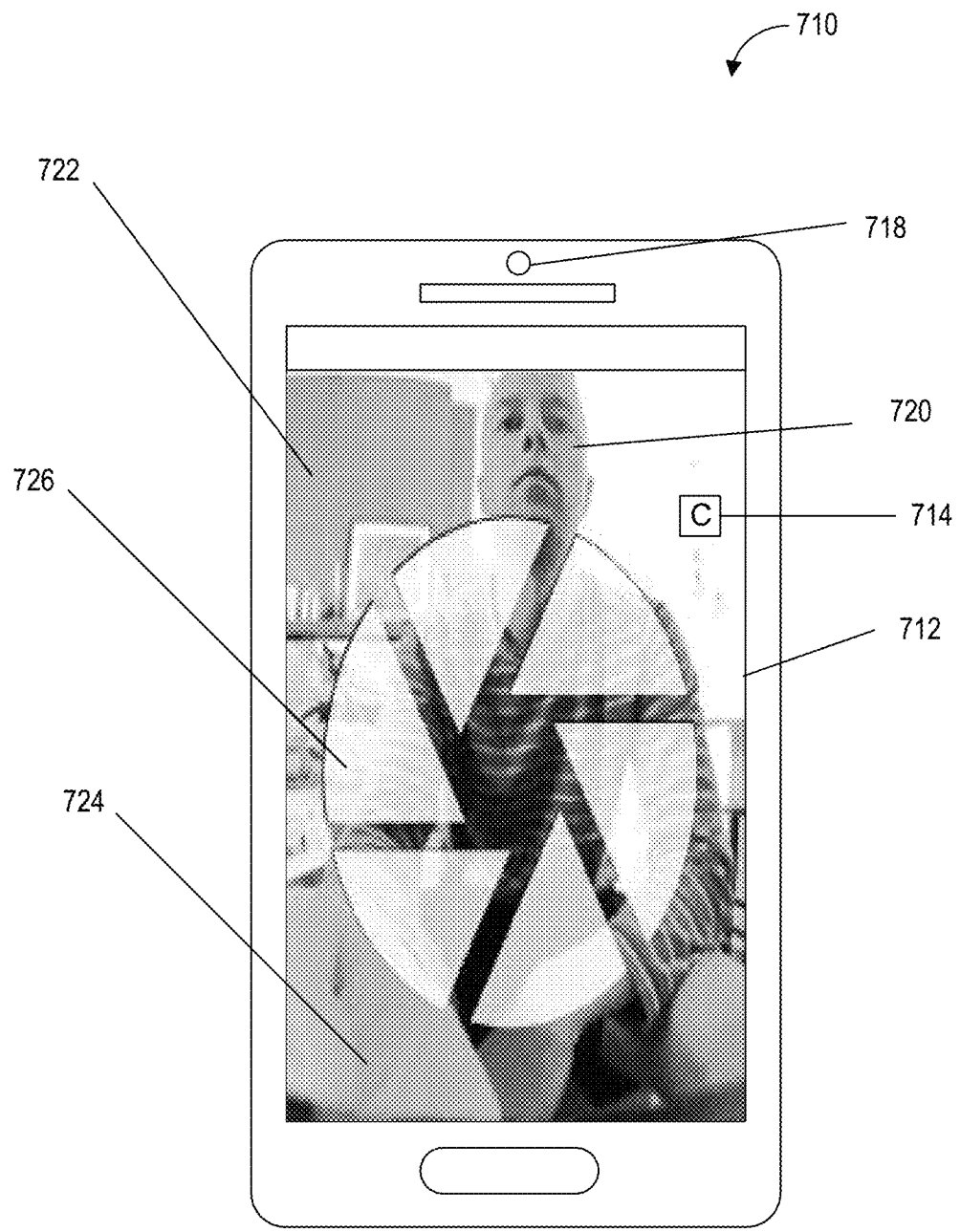
FIG. 7 depicts an example of a mode determination device including sensor based camera component activation according to example embodiments of the present disclosure.

FIG. 7 depicts an example of a mode determination device including sensor based camera component activation according to example embodiments of the present disclosure. FIG. 7 includes an illustration of mode determination device 710, one or more portions of which can include one or more systems (e.g., one or more computing systems) or devices (e.g., one or more computing devices) including one or more portions of the user computing device 102 shown in FIG. 1, and/or the mode determination system 200 shown in FIG. 2. Further, the detection, recognition, and/or processing by the mode determination device 710 can be implemented as an algorithm on the hardware components of one or more devices or systems (e.g., the user computing device 102, and/or the mode determination system 200) to, for example, activate a mode associated with the operation of one or more components. As shown, FIG. 7 illustrates a mode determination device 710, a display output component 712, an interface element 714, an image sensor (e.g., camera component) 718, an object 720, an object 722, an object 724, and an interface element 726.

The display output component 712 of the mode determination device 710 can display one or more images including images associated with an operating mode of the mode determination device 710 and/or an environment associated with the mode determination device 710. The mode determination device 710 can include one or more sensors (e.g., one or more motion sensors, image sensors, tactile sensors, and/or radar sensors) that can be used to determine the state of the mode determination device 710 (e.g., position and/or location of the mode determination device 710) including the state of the mode determination device 710 relative to one or more objects including the objects 720, 722, and 724. The mode determination device 710 can also determine based on one or more motion sensors (including, for example, image sensor 718 and/or additional motion sensors not shown including accelerometers and/or gyroscopes), that the mode determination device 710 has been moved and that the position (e.g., an angle of the mode determination device 710 relative to another object) of the mode determination device 710 has changed with respect to the object 720 (e.g., the user's face).

Further, the mode determination device 710 can also determine, using one or more motion or ranging sensors, a distance between the mode determination device 710 and one or more objects including the object 720 (e.g., a user's face), the object 722 (e.g., a wall), and/or the object 724 (e.g., a user's hand). Based on the determination that the mode determination device 710 is within an angle threshold range or that the distance between the mode determination device 710 and the object 720 has increased by a threshold distance amount or increased at a threshold acceleration, the mode determination device can activate a mode including activating one or more components of the mode determination device 710 (e.g., a microphone, a camera, and/or text input component) which can be configured to receive one or more inputs (e.g., one or more sound inputs, light inputs, and or tactile inputs).

In this example, the mode determination device 710 activates a camera mode associated with operation of the image sensor (e.g., camera component) 718. The activation of the image sensor (e.g., camera component) 718 can be indicated by the interface element 726 (e.g., a shutter icon) displayed on the display output component 712. Further, activation of the camera mode can include generating the interface element 714 (e.g., a camera button) on the display output component 712, which can be used to control operation of the image sensor (e.g., camera component) 718.

Figure 8:
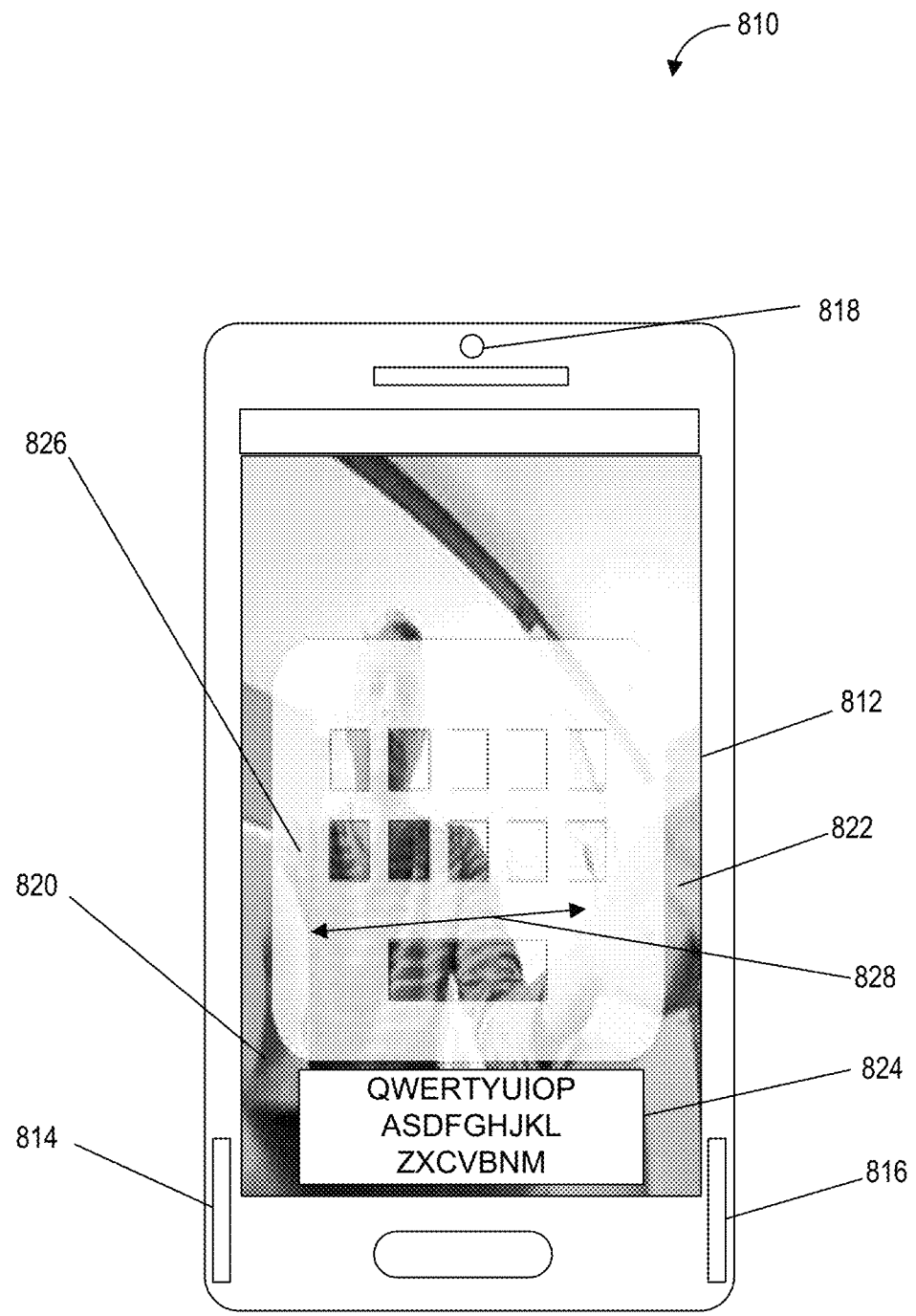
FIG. 8 depicts an example of a mode determination device including sensor based text input component activation according to example embodiments of the present disclosure.

FIG. 8 depicts an example of a mode determination device including sensor based keyboard component activation according to example embodiments of the present disclosure. FIG. 8 includes an illustration of mode determination device 810, one or more portions of which can include one or more systems (e.g., one or more computing systems) or devices (e.g., one or more computing devices) including one or more portions of the user computing device 102 shown in FIG. 1, and/or the mode determination system 200 shown in FIG. 2. Further, the detection, recognition, and/or processing by the mode determination device 810 can be implemented as an algorithm on the hardware components of one or more devices or systems (e.g., the user computing device 102, and/or the mode determination system 200) to, for example, activate a mode associated with the operation of one or more components. As shown, FIG. 8 illustrates a mode determination device 810, a display output component 812, a tactile sensor 814, a tactile sensor 816, an image sensor 818, an object 820, an object 822, an interface element 824, an interface element 826, and a distance 828.

The display output component 812 of the mode determination device 810 can display one or more images including images associated with an operating mode of the mode determination device 810 and/or an environment associated with the mode determination device 810. The mode determination device 810 can include one or more sensors (e.g., one or more motion sensors, image sensors, tactile sensors, and/or radar sensors) that can be used to determine the state of the mode determination device 810 (e.g., position and/or location of the mode determination device 810) including the state of the mode determination device 810 relative to one or more objects including the objects 820 and 822. For example, the mode determination device 810 can determine based in part on the tactile sensors 814 and 816 that the mode determination device 810 has been touched by the object 820 (e.g., a user's left hand) and/or the object 822 (e.g., a user's right hand). Further, the mode determination device 810 can determine the distance 828 between the object 820 (e.g., a left hand) and the object 822 (e.g., a right hand), which can be used to determine that the mode determination device 810 is being held in two hands. The determination of the distance 828 can be performed by the image sensor 818 and/or the tactile sensors 814 and 816.

The mode determination device 810 can also determine based on one or more motion sensors (including, for example, image sensor 818 and/or additional motion sensors not shown including accelerometers and/or gyroscopes), that the mode determination device 810 has been moved and that the position (e.g., an angle of the mode determination device 810 relative to another object) of the mode determination device 810 has changed with respect to the objects 820 and 822 (e.g., the user's hands). In some embodiments, the mode determination device 810 can also determine, using one or more object detection techniques, that the mode determination device 810 is being gazed at (e.g., gazed at by a user of the mode determination device 810).

Based on the determination that the mode determination device 810 is being gazed at and/or that the angle of the mode determination device 810 with respect to one or more objects satisfies one or more device angle criteria including whether the angle of the mode determination device is within a range of angles with respect to the one or more objects, the mode determination device can activate a mode including activating one or more components of the mode determination device 810 (e.g., a microphone, a camera, and/or text input component) which can be configured to receive one or more inputs (e.g., one or more sound inputs, light inputs, and or tactile inputs). In this example, the mode determination device 810 activates a text input mode as indicated by the interface element 826 (e.g., a text input icon) displayed on the display output component 812. Further, activation of the text input mode can include generating the interface element 824 (e.g., an onscreen keyboard) on the display output component 812, which can be used to receive text input.

Figure 9:
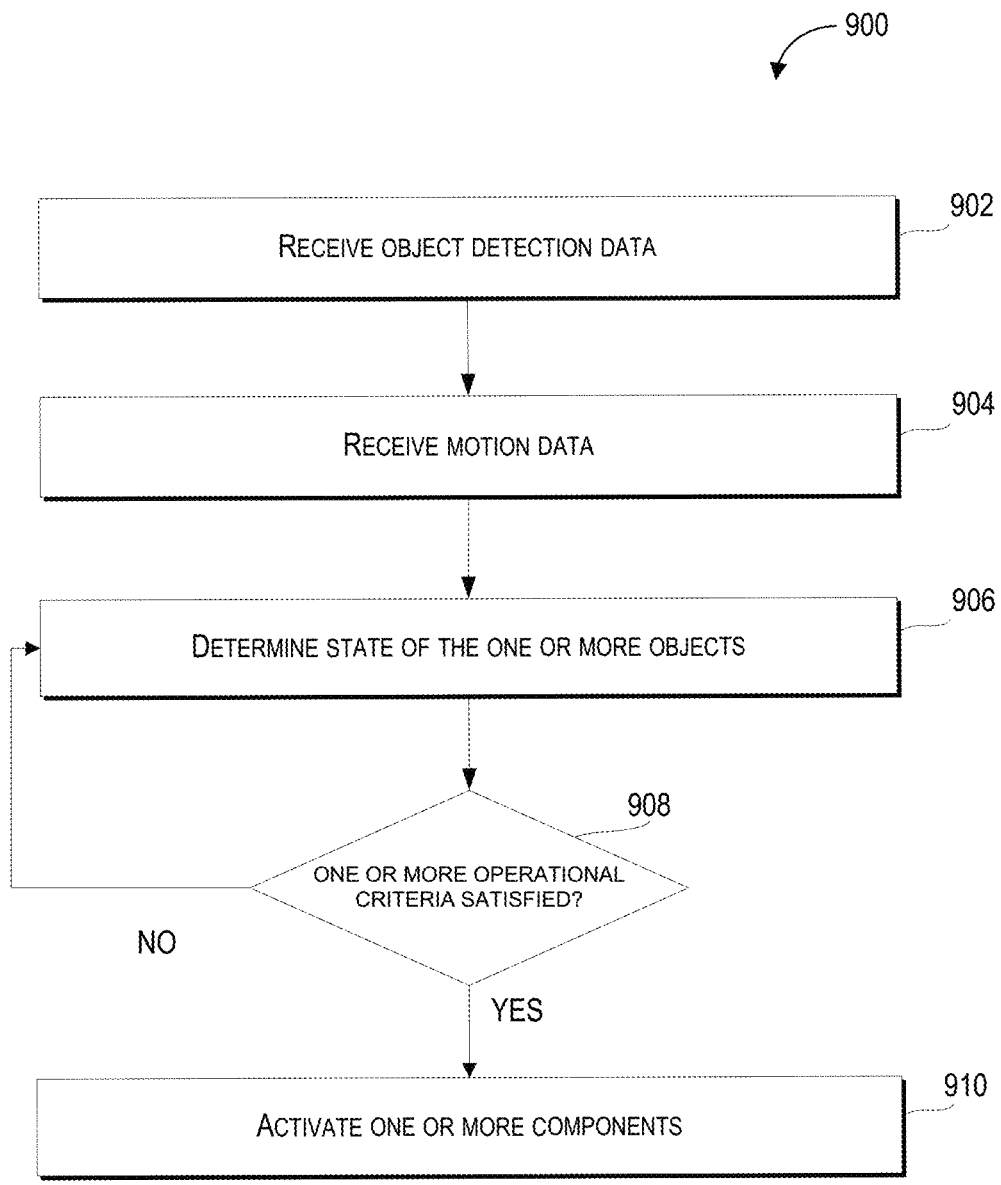
FIG. 9 depicts a flow diagram of an example method of sensor based component activation according to example embodiments of the present disclosure.

FIG. 9 depicts a flow diagram of an example method of sensor based component activation according to example embodiments of the present disclosure. One or more portions of the method 900 can be executed or implemented on one or more computing devices or computing systems including, for example, the user computing device 102, and/or the mode determination system 200. One or more portions of the method 900 can also be executed or implemented as an algorithm on the hardware components of the devices disclosed herein. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include receiving object detection data based in part on one or more sensor outputs from one or more sensors. In some embodiments, the object detection data is based in part on one or more sensor outputs from the plurality of sensors that detect one or more portions of a user of a computing device. For example, the one or more sensors can detect one or more portions of the user, whose state can be determined by the mode determination system.

Further, the one or more sensors can determine the state of an environment including for example the temperature, brightness, humidity, or pressure (e.g., air pressure) of an environment. The one or more sensors can include one or more image sensors (e.g., one or more cameras); one or more audio sensors; one or more tactile sensors; one or more motion sensors; one or more proximity sensors; one or more electromagnetic sensors; one or more thermal sensors; and/or one or more radar devices. For example, the one or more image sensors can be used to determine when a face is within the field of view of the one or more image sensors and use the detected face to activate one or more modes of the mode determination system.

The object detection data can include information associated with the state of the one or more objects including one or more sensor outputs from the plurality of sensors that detect one or more portions of a user of the computing device (e.g., the mode determination system). The state of the one or more objects can include a temporal state (e.g., the time of day when the one or more sensor outputs associated with the state of the one or more objects was generated by the one or more sensors) that can also include one or more durations of events associated with the one or more objects (e.g., the duration that a detected gaze is directed at the mode determination system). Further, the state of the one or more objects can include a position state associated with the position or location of the one or more objects including a latitude, longitude and altitude, an orientation (e.g., a compass orientation), a location of the one or more objects relative to one another, a distance between the one or more objects and the mode determination system, and/or a location of the one or more objects relative to a point of reference including the mode determination system; and/or a physical state including one or more physical characteristics (e.g., appearance including color, brightness, and/or texture; physical dimensions including size, volume, mass, and/or weight; and/or audio characteristics).

At 904, the method 900 can include receiving motion data based in part on one or more sensor outputs from one or more sensors that can be used to describe a motion of a computing device relative to a user of the computing device. For example, the one or more sensors can detect one or more objects, whose state can be determined by the mode determination system. The one or more sensors can include one or more image sensors (e.g., one or more cameras); one or more audio sensors; one or more tactile sensors; one or more motion sensors; one or more proximity sensors; one or more gyroscopic sensors; one or more accelerometers; one or more electromagnetic sensors; and/or one or more radar devices.

For example, the one or more accelerometers can include a configuration in which the one or more accelerometers can generate motion data associated with the acceleration of the mode determination system along three axes (e.g., x axis, y axis, and z axis). Further, the one or more gyroscopic sensors can be used to determine the orientation of the mode determination system. In this way, the mode determination system can use the motion data to determine the position of the mode determination system in relation to the one or more objects.

The motion data can include information associated with the state of the one or more objects including the motion of a computing device (e.g., the mode determination system) relative to a user of the computing device. The state of the one or more objects can include a temporal state (e.g., the time of day when the one or more sensor outputs associated with the state of the one or more objects was generated by the one or more sensors) that can also include one or more durations of events associated with the one or more objects (e.g., the duration that a detected gaze is directed at the mode determination system); and/or a position state associated with the position or location of the one or more objects including a latitude, longitude and altitude, an orientation (e.g., a compass orientation), a location of the one or more objects relative to one another, a distance between the one or more objects and the mode determination system, and/or a location of the one or more objects relative to a point of reference including the mode determination system.

At 906, the method 900 can include determining, based in part on the object detection data (e.g., the object detection data received at 902) and the motion data (e.g., the motion data received at 904), a state of the one or more objects which can include the state of the one or more portions of the user of the computing device, and the state of the one or more portions of the user of the computing device comprising one or more spatial relations of the one or more portions of the user of the computing device with respect to the computing device. The state of the one or more objects can include one or more spatial relations of the one or more objects with respect to the mode determination system. For example, the one or more spatial relations of the one or more objects can include a distance (e.g., a distance in millimeters, centimeters, inches or the like) and/or an orientation (e.g., an angular position of a portion of the one or more objects with respect to the mode determination system) associated with the one or more objects. Further, the one or spatial relations can include one or more relative size relations (e.g., the relative size of objects) and one or more spatial relations associated with one or more portions of an object (e.g., the distance between an eye of a face and an image sensor of a computing device).

In some embodiments, the mode determination system can determine the state of the one or more objects based in part on one or more object recognition techniques. The one or more object recognition techniques can include one or more genetic algorithms, edge matching, geometric hashing, greyscale matching, gradient matching, pose clustering, scale invariant feature transform, and/or using a machine learned model to detect and/or recognize the one or more objects.

For example, the mode determination system can access a machine learned model (e.g., access a machine learned model that has been stored locally and/or a machine learned model that is accessible on a remote computing device via a network) that has been created using a classification dataset including classifier data that includes a set of classified features and a set of classified object labels associated with training data that can be based on, or associated with, a plurality of training objects (e.g., physical objects or simulated objects that are used as training inputs for the machine learned model). The machine learned model can be created using a set of cameras and microphones that captured training data including still images, video, and tactile inputs associated with one or more objects including people and portions of people. For example, the training data can include images of one or more faces, hands, and/or eyes; and one or more tactile inputs from hands touching one or more portions of a tactile sensor.

At 908, the method 900 can include determining whether, when, or that, one or more operational criteria are satisfied. The one or more operational criteria can include one or more criteria associated with whether or not to activate one of a plurality of modes associated with operation of one or more components of a computing device (e.g., the user computing device 102). Satisfying the one or more operational criteria can include satisfying criteria related to physical characteristics (e.g., a detected face) or spatial relations (e.g., an angle, motion, or distance between one or more objects including a computing device) that are associated with one or more objects that are detected.

In response to the one or more operational criteria being satisfied, the method 900 can proceed to 910. In response to the one or more operational criteria not being satisfied, the method can end or return to a previous part of the method 900 including 902, 904, or 906.

At 910, the method 900 can include activating a mode (e.g., an input mode) of a plurality of modes associated with the operation of one or more components of a computing device (e.g., one or more components of the user computing device 102). The one or more components can be associated with performing one or more operations comprising detection of one or more inputs. The one or more components of the mode determination system can include one or more microphone components, one or more camera components, and/or one or more text input components (e.g., an onscreen keyboard generated on a touchscreen component). For example, the plurality of input modes can include a voice mode associated with recording one or more sounds via a microphone component; a camera mode associated with capturing one or more images via a camera component; and/or a text-input mode associated with receiving one or more inputs to a text input device (e.g., a keyboard).

For example, when the state of the one or more objects includes a user holding the mode determination system in two hands the mode determination system can activate a touch display component that can detect touch inputs on a keyboard interface generated on the touch display component; when the state of the one or more objects includes the mode determination system being held close to a user's face a microphone component can be activated and receive audio inputs; and/or when the state of the one or more objects includes a user moving the mode determination system away from the user a camera component can be activated and detect one or more visual inputs (e.g., inputs to a camera sensor) and or one or more tactile inputs (e.g., inputs to a shutter control on a graphical interface associated with the camera component).

Figure 10:
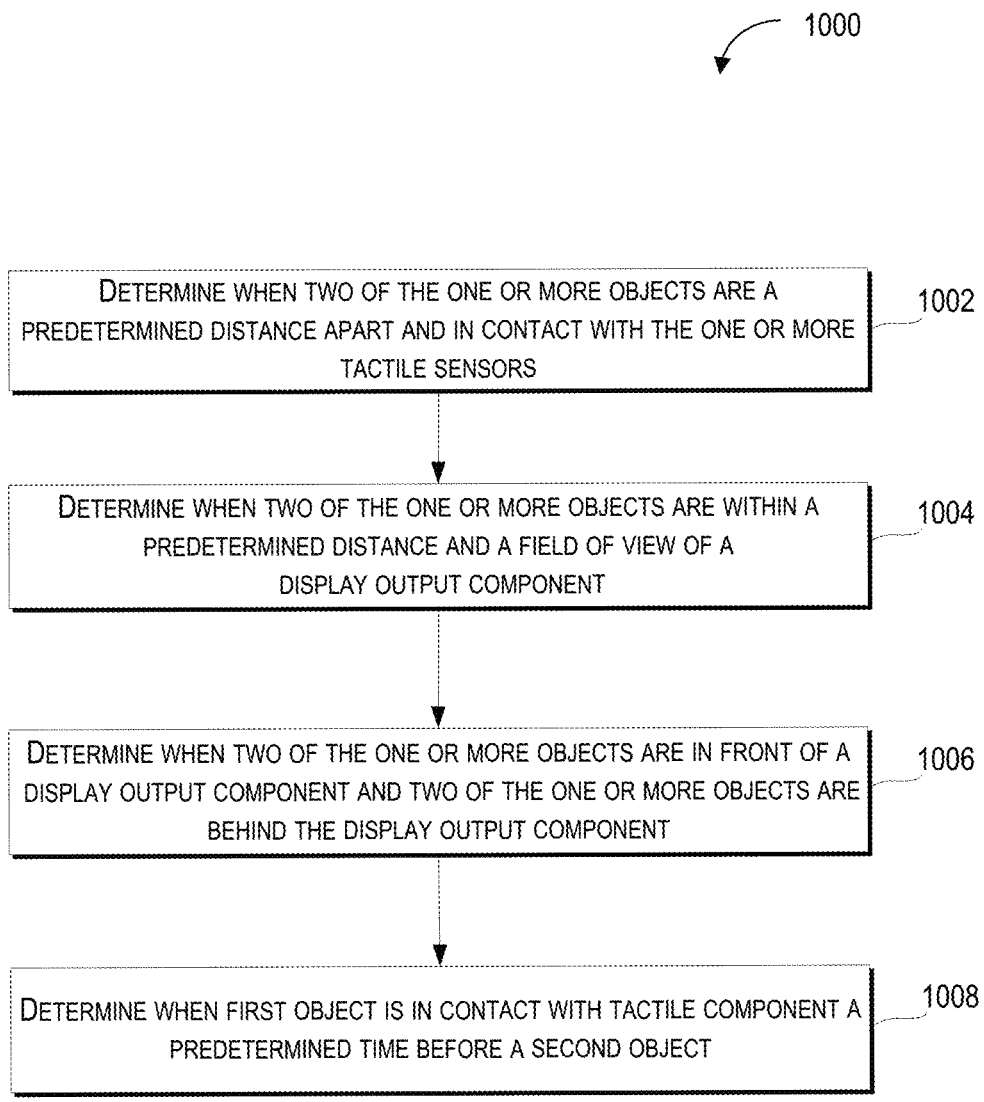
FIG. 10 depicts a second flow diagram of an example method of sensor based component activation according to example embodiments of the present disclosure.

FIG. 10 depicts a flow diagram of an example method of sensor based component activation according to example embodiments of the present disclosure. One or more portions of the method 1000 can be executed or implemented on one or more computing devices or computing systems including, for example, the user computing device 102, and/or the mode determination system 200. One or more portions of the method 1000 can also be executed or implemented as an algorithm on the hardware components of the devices disclosed herein. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include determining, based in part on the object detection data (e.g., the object detection data received at 902 in FIG. 9), that the computing device is being held in two hands when two of the one or more objects are a predetermined distance range apart and in contact with one or more tactile sensors of the mode determination system. For example, the mode determination system can include a tactile sensor on a back portion of the mode determination system (e.g., a portion of the mode determination system that is behind a display output component of the mode determination system) and determine when two of the one or more objects (e.g., two fingers) are one to three centimeters apart.

By way of further example, the tactile sensor can include a touch-screen surface that is associated with the display output component (e.g., the mode determination system will detect touching of the display output component). Further, the mode determination system can include a tactile sensor on any of the surfaces of the mode determination system (e.g., a tactile sensor on the back or edges including the left edge, right edge, top edge, or bottom edge). In some embodiments, satisfying the one or more operational criteria at 908 can include determining at 1002 that the mode determination system is being held in two hands including when two of the one or more objects are a predetermined distance range apart and in contact with one or more tactile sensors of the mode determination system.

At 1004, the method 1000 can include determining, based in part on the object detection data (e.g., the object detection data received at 902 in FIG. 9), that the mode determination system is being held in two hands when two of the one or more objects are within a predetermined distance and a field of view associated with a display output component of the mode determination system. For example, the mode determination system can use a camera component to determine that two of the one or more objects (e.g., two thumbs) are within a field of view of a camera that captures one or more images on a side of the mode determination system that includes a touch screen component that receives touch inputs. In some embodiments, satisfying the one or more operational criteria at 908 can include determining at 1004 that the mode determination system is being held in two hands including determining when two of the one or more objects are within a predetermined distance and a field of view associated with a display output component of the mode determination system.

At 1006, the method 1000 can include determining, based in part on the object detection data (e.g., the object detection data received at 902 in FIG. 9), that the mode determination system is being held in two hands when at least two of the one or more objects are detected to be in contact with two or more portions of one or more tactile sensors behind a front portion of a display output component of the mode determination system and two of the one or more objects are detected within a predetermined distance in front of the front portion of the display output component. For example, the mode determination system can detect two sets of fingers behind the display output component (e.g., an OLED screen) and two thumbs within two centimeters of the display output component. In some embodiments, satisfying the one or more operational criteria at 908 can include determining at 1006 that the mode determination system is being held in two hands including when at least two of the one or more objects are detected to be in contact with two or more portions of one or more tactile sensors behind a front portion of a display output component of the mode determination system and two of the one or more objects are detected within a predetermined distance in front of the front portion of the display output component.

At 1008, the method 1000 can include determining, based in part on the object detection data (e.g., object detection data received at 902 in FIG. 9), that the computing system is being held in two hands when a first object of the one or more objects is detected to be in contact with a first portion of a tactile sensor of the computing system for a predetermined period of time before a second object of the one or more objects is detected to be in contact with a second portion of the tactile sensor. For example, a user of the mode determination system can lift the mode determination system in one hand (thereby touching the first portion of the tactile sensor) for a predetermined period of time (e.g., a half second) before placing their other hand on the second portion of the tactile sensor of the mode determination system.

In some embodiments, satisfying the one or more operational criteria at 908 can include determining at 1008 that the computing system is being held in two hands when a first object of the one or more objects is detected to be in contact with a first portion of a tactile sensor of the computing system for a predetermined period of time before a second object of the one or more objects is detected to be in contact with a second portion of the tactile sensor.

Figure 11:
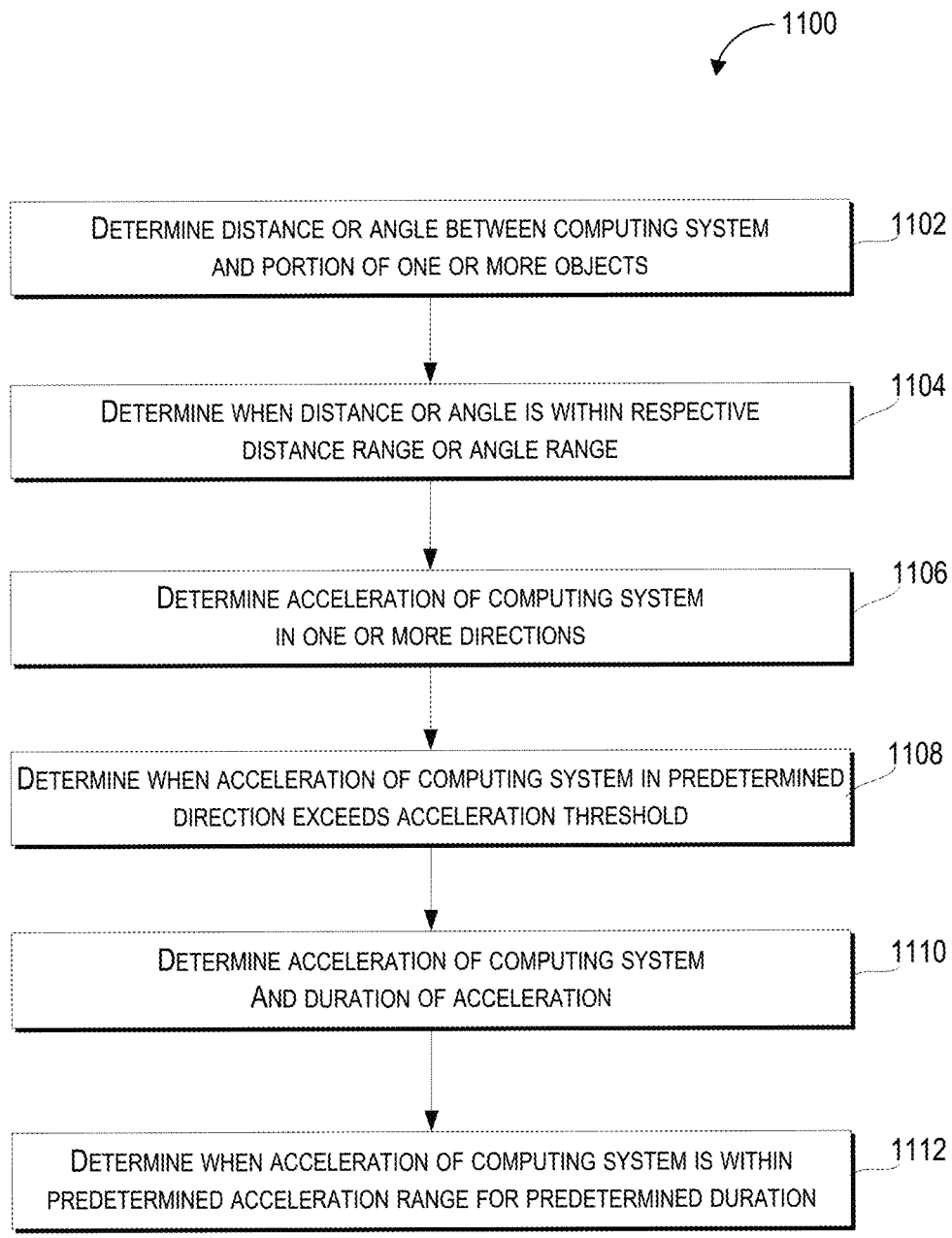
FIG. 11 depicts a third flow diagram of an example method of sensor based component activation according to example embodiments of the present disclosure.

FIG. 11 depicts a flow diagram of an example method of sensor based component activation according to example embodiments of the present disclosure. One or more portions of the method 1100 can be executed or implemented on one or more computing devices or computing systems including, for example, the user computing device 102, and/or the mode determination system 200. One or more portions of the method 1100 can also be executed or implemented as an algorithm on the hardware components of the devices disclosed herein. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include determining, based in part on the one or more spatial relations of the one or more objects relative to the computing device, a distance and/or an angle between the mode determination system (e.g., one or more reference points associated with the mode determination system) and at least a portion of the one or more objects. For example, the mode determination system can determine the distance and/or the angular position between an image sensor of the mode determination system and a detected face or face portion of a user. Other detected objects can include a user's hand(s) or portions thereof (e.g., thumb(s), finger(s), and/or a heel), and/or a stylus held by or operated by a user.

At 1104, the method 1100 can include determining when the distance or the angle between the mode determination system and the portion of the one or more objects is within a distance range or angle range respectively. For example, the mode determination system can determine that the detected face is within forty centimeters and at a forty-five degree angle with respect to the image sensor of the mode determination system. In some embodiments, satisfying the one or more operational criteria at 908 can include determining at 1104 that the distance or the angle between the mode determination system and the one or more objects is within the distance range or the angle range respectively.

At 1106, the method 1100 can include determining, based in part on the motion data (e.g., motion data received at 904 in FIG. 9), motion of the mode determination system in one or more directions relative to a portion of the one or more objects. The motion of the mode determination system can include different aspects of the motion of the mode determination system including the acceleration, velocity, displacement, and/or change in the position (e.g., rotation about an axis of the motion determination system) of the motion determination system. Further, the motion of the motion determination system can be determined in multiple ways via one or more motion sensors that can include a gravity sensor, a linear acceleration sensor, a rotation vector sensor, an accelerometer, and/or a gyroscope. The one or more motion sensors can include hardware-based motion sensors, software-based motion sensors, and/or motion sensors that combine the use of hardware and software to determine motion of the mode determination system. For example, the mode determination system can determine the acceleration of the mode determination system in a particular direction using one or more accelerometers in the mode determination system.

At 1108, the method 1100 can include determining when the acceleration of the mode determination system in a predetermined direction relative to a portion of the one or more objects exceeds an acceleration threshold. For example, the predetermined direction can be directly away from the predetermined portion of the one or more objects and exceeding the acceleration threshold can occur when the mode determination system's acceleration exceeds one meter per second squared. In some embodiments, satisfying the one or more operational criteria at 908 can include determining at 1108 that the acceleration of the mode determination system in the predetermined direction exceeds the acceleration threshold.

At 1110, the method 1100 can include determining, based in part on the motion data (e.g., motion data received at 904 in FIG. 9), acceleration and duration of the acceleration of the user computing device. For example, one or more motion sensors (e.g., one or more accelerometers and/or gyroscopes) and chronometers in the user computing device can be used to determine the acceleration and duration of acceleration of the user computing device.

At 1112, the method 1100 can include determining, based in part on the motion data (e.g., motion data received at 904 in FIG. 9), when the user computing device undergoes acceleration within a predetermined acceleration range for a predetermined duration. For example, the user computing device can include one or more accelerometers to determine when the acceleration of the user computing device is within an acceleration range (e.g., an acceleration between half a meter per second squared and two meters per second squared) and also determine, using a chronometer component, when the acceleration range is maintained for the predetermined duration (e.g., a duration of half a second). In some embodiments, satisfying the one or more operational criteria at 908 can include determining at 1112 that the user computing device has undergone acceleration within the predetermined acceleration range for the predetermined duration.

Figure 12:
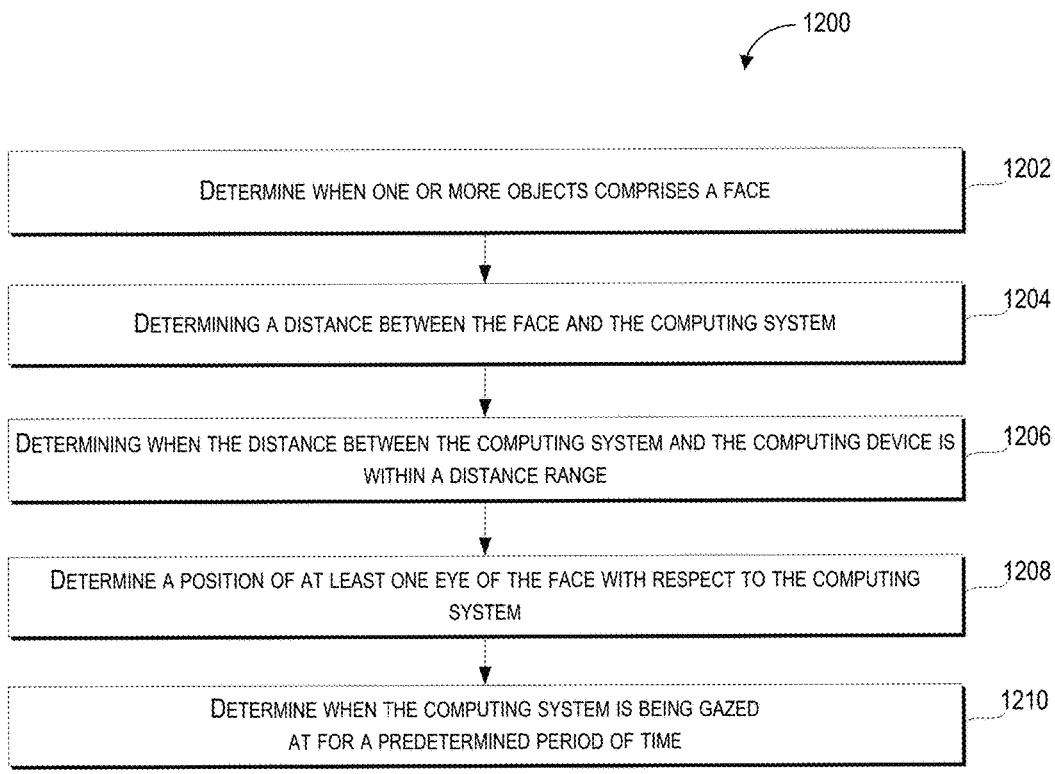
FIG. 12 depicts a fourth flow diagram of an example method of sensor based component activation according to example embodiments of the present disclosure.

FIG. 12 depicts a flow diagram of an example method of sensor based component activation according to example embodiments of the present disclosure. One or more portions of the method 1200 can be executed or implemented on one or more computing devices or computing systems including, for example, the user computing device 102, and/or the mode determination system 200. One or more portions of the method 1200 can also be executed or implemented as an algorithm on the hardware components of the devices disclosed herein. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include determining, based in part on the object detection data (e.g., object detection data received at 902 in FIG. 9), when the one or more objects include a face. For example, the mode determination system can use one or more face detection and/or face recognition techniques to determine when a face is among the one or more objects. In some embodiments, the mode determination system can compare the face to one or more authorized faces and, based in part on matching the face to the one or more authorized faces, determine when the face is authorized to access the device.

At 1204, the method 1200 can include determining a distance between the face and the user computing device (e.g., the distance can be determined using one or more image sensors (e.g., a camera) and/or proximity sensors (e.g., RADAR device or the like).

At 1206, the method 1200 can include determining when the distance between the computing device and the face is within a distance range (e.g., determining when the distance between the face and the user computing device is less than twenty centimeters). In some embodiments, satisfying the one or more operational criteria at 908 can include determining at 1206 that the distance between the user computing device and the face is within the distance range.

At 1208, the method 1200 can include determining, based in part on the object detection data (e.g., object detection data received at 902 in FIG. 9), a position of at least one eye of the face with respect to the user computing device. For example, the user computing device can analyze the geometry of the face and/or determine portions of the face associated with a pupil of an eye, to determine the position of an eye.

At 1210, the method 1200 can include determining, based in part on the position of the at least one eye of the face with respect to the user computing device, when the user computing device or a component of the user computing device (e.g., a camera component) is being gazed at for a predetermined period of time (e.g., two seconds). In some embodiments, satisfying the one or more operational criteria at 908 can include determining at 1210 that the user computing device is being gazed at for a predetermined period of time.

Figure 13:
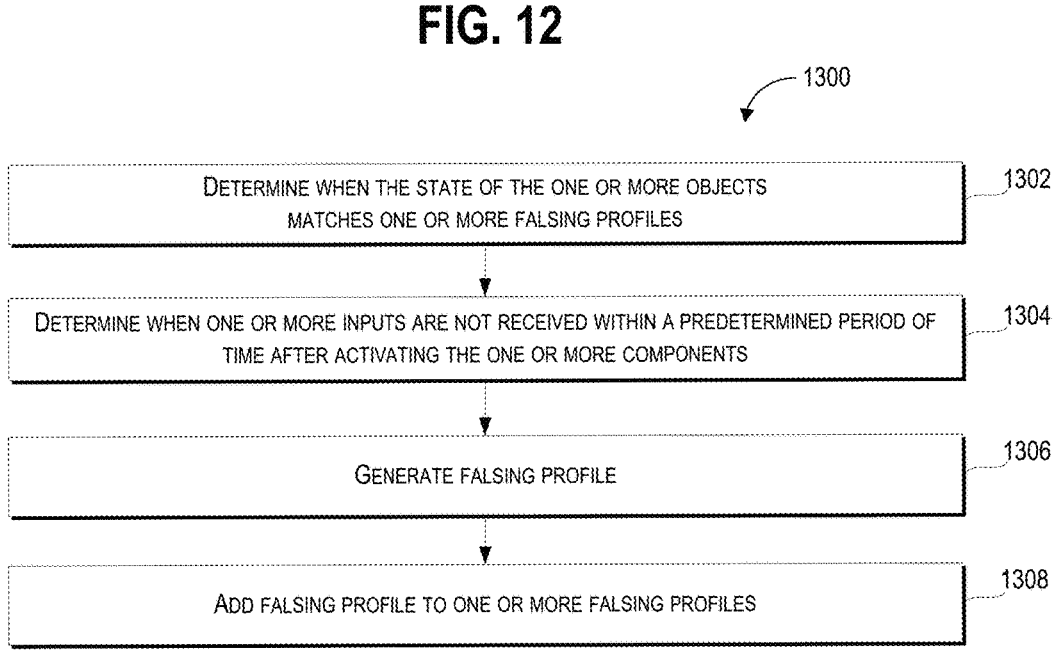
FIG. 13 depicts a fifth flow diagram of an example method of sensor based component activation according to example embodiments of the present disclosure.

FIG. 13 depicts a flow diagram of an example method of sensor based component activation according to example embodiments of the present disclosure. One or more portions of the method 1300 can be executed or implemented on one or more computing devices or computing systems including, for example, the user computing device 102, and/or the mode determination system 200. One or more portions of the method 1300 can also be executed or implemented as an algorithm on the hardware components of the devices disclosed herein. FIG. 13 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include determining, based in part on the object detection data (e.g., object detection data received at 902 in FIG. 9) and the motion data (e.g., motion data received at 904 in FIG. 9), when the state of the one or more objects relative to the user computing device matches one or more falsing profiles associated with a state of the one or more objects relative to the user computing device that does not activate the one or more components of the user computing device. The object detection data and the motion data received by the user computing device can include one or more sensory outputs that are based on actions by a user that are not intended to activate the one or more components of the user computing device.

As such, the user computing device can include data associated with one or more falsing profiles that include information associated with sensor outputs that are associated with one or more states of the one or more objects that do not activate the one or more components of the user computing device. For example, the one or more falsing profiles can include an acceleration range of the one or more objects relative to the user computing device in a particular direction for a predetermined period of time. In some embodiments, satisfying the one or more operational criteria at 908 can include determining at 1302 that the state of the one or more objects relative to the user computing device does not match any of the one or more falsing profiles.

At 1304, the method 1300 can include determining when the one or more inputs are not received within a predetermined period of time after the activating the one or more components of the user computing device. For example, when one or more components of the user computing device are activated and the one or more inputs (e.g., touching a display output component of the user computing device) are not received within three seconds.

At 1306, the method 1300 can include generating a falsing profile based in part on the object detection data (e.g., object detection data received at 902 in FIG. 9) and the motion data (e.g., motion data received at 904 in FIG. 9) received within a falsing time interval comprising a time when the one or more components are activated and the one or more inputs are not received. For example, the object detection data and the motion data recorded in the three seconds prior to activating the one or more components of the user computing device can be used as the basis for a falsing profile.

At 1308, the method 1300 can include adding the falsing profile to the one or more falsing profiles. In this way, the user computing device can modify and improve the one or more falsing profiles by adding individualized profiles based in part on the user of the user computing device. In some embodiments, the falsing profile can be added to one or more falsing profiles stored on a remote computing device that includes falsing profiles from other computing devices used by other users. In this way, falsing profiles generated for one device can be shared with other devices, thereby enabling other devices to realize the benefits of improved battery efficiency and more efficient processor utilization that results from the falsing profile.

Figure 14:
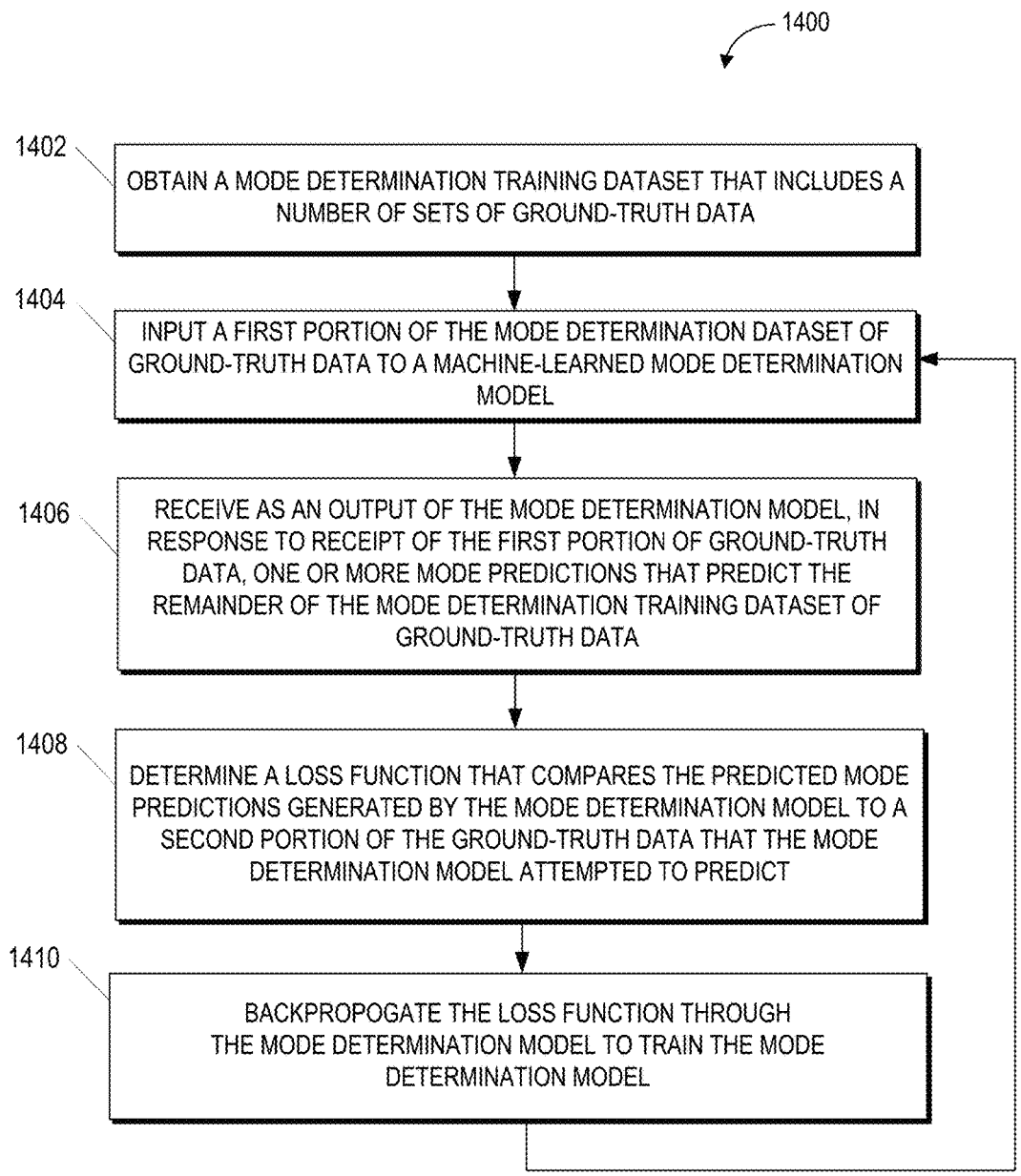
FIG. 14 depicts a sixth flow diagram of an example method of sensor based component activation according to example embodiments of the present disclosure.

FIG. 14 depicts a flow diagram of an example method of sensor based component activation according to example embodiments of the present disclosure. One or more portions of the method 1400 can be executed or implemented on one or more computing devices or computing systems including, for example, the user computing device 102, the machine learning computing system 130, the training computing system 150, and/or the mode determination system 200. One or more portions of the method 1400 can also be executed or implemented as an algorithm on the hardware components of the devices disclosed herein. FIG. 14 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1402, the method 1400 can include obtaining sensor data including one or more vectors of sensor data sampled from multiple sensors and also a timestamp associated with each sensor data sample. For example, the sensor data can include the object detection data and/or motion data in the method 900. In some implementations, the multiple sensors include at least one motion sensor for determining motion/movement of a computing device (e.g., an accelerometer, a gyroscope, an image sensor, a position sensor, etc.) and at least one object detection sensor (e.g., an image sensor, a proximity sensor) for detecting objects positioned relative to the computing device (e.g., a user or portion of a user including face, hands, fingers, etc.) In some implementations, the sensor data can be iteratively updated, refreshed, or generated as additional sensor data is detected by the computing device sensors.

In some embodiments, the machine-learned mode determination model can be trained to receive such sensor data input and output a prediction of a mode for the computing device. The mode can be determined, for example, from a predefined set of modes such as a camera mode, voice mode, keyboard mode, etc. In one example, when sensor data leads to determination that a movement of a computing device corresponds to a movement of the computing device away from a user's face, then the machine-learned mode determination model can be trained to output a prediction of a camera mode for the computing device.

In another example, when sensor data leads to determination that a movement of a computing device corresponds to a movement of the computing device towards a user's face, then the machine-learned mode determination model can be trained to output a prediction of a voice mode for the computing device. In another example, when sensor data leads to a determination that a movement of the computing device corresponds to movement of the computing device towards a user (e.g., towards a user's face) and that object detection by the computing device corresponds to a holding configuration of the computing device indicative of a user holding the computing device with two hands, then the machine-learned mode determination model can be trained to output a prediction of a keyboard mode for the computing device.

In some implementations, when training the machine-learned mode determination model to determine an input mode for operating the computing device, a mode determination training dataset can include a large number of previously obtained sensor data samples and corresponding labels that describe corresponding input modes to be triggered or not triggered based on those sensor data samples.

In one implementation, the mode determination training dataset includes a first portion of data corresponding to sensor data samples originating from one or more computing device sensors at one or more times. Depending on the model, the sensor data samples can include time-correlated sensor data from one or more of a motion sensor, image sensor, tactile sensor, proximity sensor, and the like. Such sensor data can be recorded while a computing device is in operation by one or more users. The mode determination training dataset can further include a second portion of data corresponding to labels identifying if one or more particular modes should or should not be triggered based on the sensor data. The labels included within the second portion of data within the mode determination training dataset can be manually annotated, automatically annotated, or annotated using a combination of automatic labeling and manual labeling.

At 1404, the method 1400 can include inputting a first portion of a set of ground-truth data (e.g., the first portion of the mode determination training dataset corresponding to sensor data samples) into the machine-learned mode determination model to be trained. For example, the first portion of the set of ground-truth data can be input into a training computing system (e.g., the training computing system 150).

At 1406, the method 1400 can include, in response to receipt of the first portion of the set of ground-truth data, outputting a mode prediction for the computing device. This output of the machine-learned mode determination model can predict the remainder of the set of ground-truth data (e.g., the second portion of the mode determination training dataset).

At 1408, the method 1400 can include, applying or otherwise determining a loss function that includes comparing the mode prediction(s) output by the machine-learned mode determination model to the remainder of the ground-truth data which the mode determination model attempted to predict.

At 1410, the method 1400 can include backpropagating the loss function through the mode determination model to train the mode determination model (e.g., by modifying one or more weights associated with the mode determination model). This process of inputting ground-truth data, determining a loss function and backpropagating the loss function through the mode determination model can be repeated multiple times as part of training the mode determination model. For example, the process can be repeated for each of numerous sets of ground-truth data provided within the mode determination training dataset.

In some implementations, after an initially trained machine-learned mode determination model is implemented on a computing device, the computing device can gather additional training samples based on interaction by one or more specific users with the computing device. These additional training samples can be used to retrain a machine-learned mode determination model to personalize the mode determination model based on specific user data (e.g., specific user voice, hand holding configurations, etc.).

In some implementations, the computing device can also be configured to determine an update that describes the parameters of a retrained machine-learned mode determination model or changes to the parameters of the machine-learned mode determination model that occurred during the retraining of model. The computing device can then transmit such update(s) to a central server computing device (e.g., "the cloud") for aggregation with other updates provided by other computing devices. Thus, the platform can enable participation in a process known as "federated learning," in which a device determines a local update to a model based on locally stored data and then communicates the local update to a cloud service (e.g., in a privacy preserving and communication efficient manner) for aggregation to generate a global update to the model.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of mode determination, the method comprising:

receiving, by a computing system comprising one or more computing devices, object detection data based in part on one or more sensor outputs from a plurality of sensors that detect one or more portions of a user of the computing system;

receiving, by the computing system, motion data based in part on one or more sensor outputs from the plurality of sensors, wherein the motion data describes a motion of the computing system relative to the user of the computing system;

determining, by the computing system, based in part on the object detection data, a state of the one or more portions of the user of the computing system comprising one or more spatial relations of the one or more portions of the user of the computing system with respect to the computing system;

determining, by the computing system, based in part on the object detection data and the motion data, when the state of the one or more portions of the user relative to the computing system matches one or more falsing profiles associated with a state of the one or more portions of the user relative to the computing system that does not activate the one or more components, wherein the satisfying the one or more operational criteria comprises the state of the one or more portions of the user relative to the computing system not matching any of the one or more falsing profiles; and responsive to the state of the one or more portions of the user of the computing system satisfying one or more operational criteria, activating, by the computing system, an input mode of a plurality of input modes associated with activating one or more components of the computing system, the one or more components comprising one or more microphone components, one or more camera components, or one or more text input components, wherein the one or more components are associated with performing one or more operations comprising detection of one or more inputs.

2. The computer-implemented method of claim 1, further comprising:
determining, by the computing system, based in part on the one or more spatial relations of the one or more portions of the user, a distance or an angle between the computing system and the one or more portions of the user; and
determining, by the computing system, when the distance or the angle between the computing system and the one or more portions of the user is within a distance range or angle range respectively, wherein the satisfying the one or more operational criteria comprises the determining that the distance or the angle between the computing system and the one or more portions of the user is within the distance range or the angle range respectively.

3. The computer-implemented method of claim 1, further comprising:
determining, by the computing system, based in part on the object detection data, when the one or more portions of the user comprise a face;
determining, by the computing system, a distance between the face and the computing system; and
determining, by the computing system, when the distance between the computing system and the face is within a distance range, wherein the satisfying the one or more operational criteria comprises the determining that the distance between the computing system and the face is within the distance range.

4. The computer-implemented method of claim 3, further comprising:
determining, by the computing system, based in part on the object detection data, a position of at least one eye of the face with respect to the computing system; and
determining, by the computing system, based in part on the position of the at least one eye of the face with respect to the computing system, when the computing system is being gazed at for a predetermined period of time, wherein the satisfying the one or more operational criteria comprises the determining that the computing system is being gazed at for the predetermined period of time.

5. The computer-implemented method of claim 1, further comprising:
determining, by the computing system, based in part on the motion data, an acceleration of the computing system in one or more directions relative to the one or more portions of the user; and
determining, by the computing system, when the acceleration of the computing system in a predetermined direction of the one or more directions exceeds an acceleration threshold, wherein the satisfying the one or more operational criteria comprises the acceleration of the computing system in the predetermined direction exceeding the acceleration threshold.

6. The computer-implemented method of claim 1, further comprising:
determining, by the computing system, based in part on the motion data, an acceleration and a duration of the acceleration of the computing system; and
determining, by the computing system, based in part on the motion data, when the computing system undergoes acceleration within a predetermined acceleration range for a predetermined duration, wherein the satisfying the one or more operational criteria comprises the computing system undergoing acceleration within the predetermined acceleration range for the predetermined duration.

7. The computer-implemented method of claim 1, further comprising:
determining, by the computing system, based in part on the object detection data, that the computing system is being held in two hands when two of the one or more portions of the user are a predetermined distance range apart and in contact with one or more tactile sensors of the computing system, wherein the satisfying the one or more operational criteria comprises the determining that the computing system is being held in two hands.

8. The computer-implemented method of claim 1, further comprising:
determining, by the computing system, based in part on the object detection data, that the computing system is being held in two hands when two of the one or more portions of the user are within a predetermined distance and a field of view associated with a display output component of the computing system, wherein the satisfying the one or more operational criteria comprises the determining that the computing system is being held in two hands.

9. The computer-implemented method of claim 1, further comprising:
determining, by the computing system, based in part on the object detection data, that the computing system is being held in two hands when at least two of the one or more portions of the user are detected to be in contact with two or more portions of one or more tactile sensors behind a front portion of a display output component of the computing system and two of the one or more portions of the user are detected within a predetermined distance in front of the front portion of the display output component, wherein the satisfying the one or more operational criteria comprises the determining that the computing system is being held in two hands.

10. The computer-implemented method of claim 1, further comprising:
determining, by the computing system, when the one or more inputs are not received within a predetermined period of time after the activating the one or more components;
generating, by the computing system, a falsing profile based in part on the object detection data and the motion data received within a falsing time interval comprising a time when the one or more components are activated and the one or more inputs are not received; and
adding, by the computing system, the falsing profile to the one or more falsing profiles.

11. The computer-implemented method of claim 1, wherein the one or more sensors comprise one or more image sensors, one or more audio sensors, one or more tactile sensors, one or more gyroscopic sensors, one or more accelerometers, one or more electromagnetic sensors, one or more thermal sensors, or one or more radar devices.

12. The computer-implemented method of claim 1, wherein determining, by the computing system, based in part on the object detection data and the motion data, the state of the one or more portions of the user, the state of the one or more portions of the user comprising one or more spatial relations of the one or more portions of the user with respect to the computing system comprises:
inputting, by the computing system, the object detection data and the motion data to a machine-learned mode determination model, wherein the machine-learned mode determination model has been trained to receive object detection data and motion data and, in response to receipt of the object detection data and motion data, output one or more predicted modes for operating the computing system; and receiving, by the computing system as an output of the machine-learned mode determination model, one or more predicted modes for operating the computing system.

13. A mode determination system, comprising:

one or more processors;

a machine-learned mode determination model, wherein the machine-learned mode determination model has been trained to receive object detection data and, in response to receipt of the object detection data, output mode predictions for a computing device; and at least one tangible, non-transitory computer readable medium that stores instructions that, when executed by the one or more processors, cause the one or more processors to perform operations, the operations comprising:

obtaining sensor data from a plurality of sensors of a computing device, wherein the sensor comprises at least object detection data and motion data, the object detection data associated with the state of one or more portions of a user of a computing device, wherein the motion data describes a motion of the computing device relative to the user of the computing device;

inputting the object detection data into the machine-learned mode determination model, wherein the machine-learned mode determination model determines, based in part on the object detection data and the motion data, when the state of the one or more portions of the user relative to the computing device matches one or more falsing profiles associated with a state of the one or more portions of the user relative to the computing device that does not activate the one or more components, wherein the satisfying the one or more operational criteria comprises the state of the one or more portions of the user relative to the computing device not matching any of the one or more falsing profiles; and receiving, as output of the machine-learned mode determination model, a mode prediction for the computing device.

14. The mode determination system of claim 13, wherein the operations further comprise activating a component of the computing device that correlates with the mode prediction.

15. The mode determination system of claim 13, wherein the machine-learned mode determination model comprises a recurrent neural network.

16. A computing device that automatically initiates an input mode, comprising:

a plurality of sensors;

at least one processor; and at least one tangible, non-transitory computer-readable medium that stores instructions that, when executed by the at least one processor, cause the at least one processor to perform operations, the operations comprising:

receiving object detection data based in part on one or more sensor outputs from the plurality of sensors that detect one or more portions of a user of the computing device;

receiving motion data based in part on one or more sensor outputs from the plurality of sensors, the motion data describing a motion of the computing device relative to the user of the computing device;

determining, based in part on the object detection data, a state of the one or more portions of the user of the computing device, the state of the one or more portions of the user of the computing device comprising one or more spatial relations of the one or more portions of the user of the computing device with respect to the computing device;

determining, based in part on the object detection data and the motion data, when the state of the one or more portions of the user relative to the computing system matches one or more falsing profiles associated with a state of the one or more portions of the user relative to the computing system that does not activate the one or more components, wherein the satisfying the one or more operational criteria comprises the state of the one or more portions of the user relative to the computing system not matching any of the one or more falsing profiles;

responsive to the state of the one or more portions of the user of the computing device satisfying one or more operational criteria, activating an input mode of a plurality of input modes associated with activating one or more components of the computing device, the one or more components comprising one or more microphone components, one or more camera components, or one or more text input components, wherein the one or more components are associated with performing one or more operations comprising detection of one or more inputs.

17. The computing device of claim 16, wherein the plurality of sensors include one or more accelerometers, one or more radar sensors, one or more tactile sensors, or one or more image sensors.

18. The computing device of claim 16, further comprising:

determining, based in part on the one or more spatial relations of the one or more portions of the user, a distance or an angle between the computing device and the one or more portions of the user; and determining when the distance or the angle between the computing device and the one or more portions of the user is within a distance range or angle range respectively, wherein the satisfying the one or more operational criteria comprises the determining that the distance or the angle between the computing device and the one or more portions of the user is within the distance range or the angle range respectively.

19. The computing device of claim 16, further comprising:

determining, based in part on the object detection data, when the one or more portions of the user comprise a face;

determining a distance between the face and the computing device; and determining when the distance between the computing device and the face is within a distance range, wherein the satisfying the one or more operational criteria comprises the determining that the distance between the computing device and the face is within the distance range.

20. The computing device of claim 16, further comprising:

determining when the one or more inputs are not received within a predetermined period of time after the activating the one or more components;

generating a falsing profile based in part on the object detection data and the motion data received within a falsing time interval comprising a time when the one or more components are activated and the one or more inputs are not received; and adding the falsing profile to the one or more falsing profiles.

* * * * *